United States Patent

Wakabayashi et al.

[11] Patent Number: 5,995,761
[45] Date of Patent: *Nov. 30, 1999

[54] CAMERA HAVING VIBRATION CORRECTING DEVICE

[75] Inventors: Hiroshi Wakabayashi, Yokohama; Hidenori Miyamoto, Urayasu; Sueyuki Ohishi, Tokyo; Yoshio Imura, Kawasaki, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/931,934

[22] Filed: Sep. 17, 1997

Related U.S. Application Data

[63] Continuation of application No. 08/773,292, Dec. 24, 1996, abandoned, which is a continuation of application No. 08/377,796, Jan. 24, 1995, abandoned.

[30] Foreign Application Priority Data

| Apr. 8, 1994 | [JP] | Japan | 6-095605 |
| Apr. 12, 1994 | [JP] | Japan | 6-097058 |
| Apr. 28, 1994 | [JP] | Japan | 6-0921631 |

[51] Int. Cl.$^6$ .............. G03B 15/05; G03B 5/00
[52] U.S. Cl. ............................. 396/54; 396/169
[58] Field of Search ................ 396/246, 169, 396/52–55

[56] References Cited

U.S. PATENT DOCUMENTS

| 5,084,724 | 1/1992 | Maeno | 354/430 |
| 5,124,741 | 6/1992 | O'Such et al. | 354/441 |
| 5,220,364 | 6/1993 | Kobayshi et al. | 354/412 |
| 5,233,384 | 8/1993 | Katoh et al. | 354/414 |
| 5,250,979 | 10/1993 | Wheeler | 354/423 |
| 5,319,413 | 6/1994 | Katoh et al. | 354/412 |
| 5,353,091 | 10/1994 | Ishida et al. | 354/410 |
| 5,420,661 | 5/1995 | Hamada et al. | 354/412 |

*Primary Examiner*—Safet Metjahic
*Assistant Examiner*—Michael Dalakis

[57] ABSTRACT

A camera including a flashlight device for emitting a flashlight, a shutter, such that the camera has a flash synchro photographing mode in which the flashlight device emits the flashlight in synchronism with the shutter, a vibration detector for detecting a vibration quantity of the camera, a vibration correcting device for correcting an image blur on the basis of a vibration signal output from the vibration detector. The camera also includes a control device for controlling, while performing flash photographing by use of the flashlight device and driving the vibration correcting device, the shutter so that a maximum shutter time in the flash synchro photographing mode is shorter than or equal to a maximum shutter time in a non-emission of the flashlight. As a result, the flashlight device does not emit the flashlight.

12 Claims, 22 Drawing Sheets

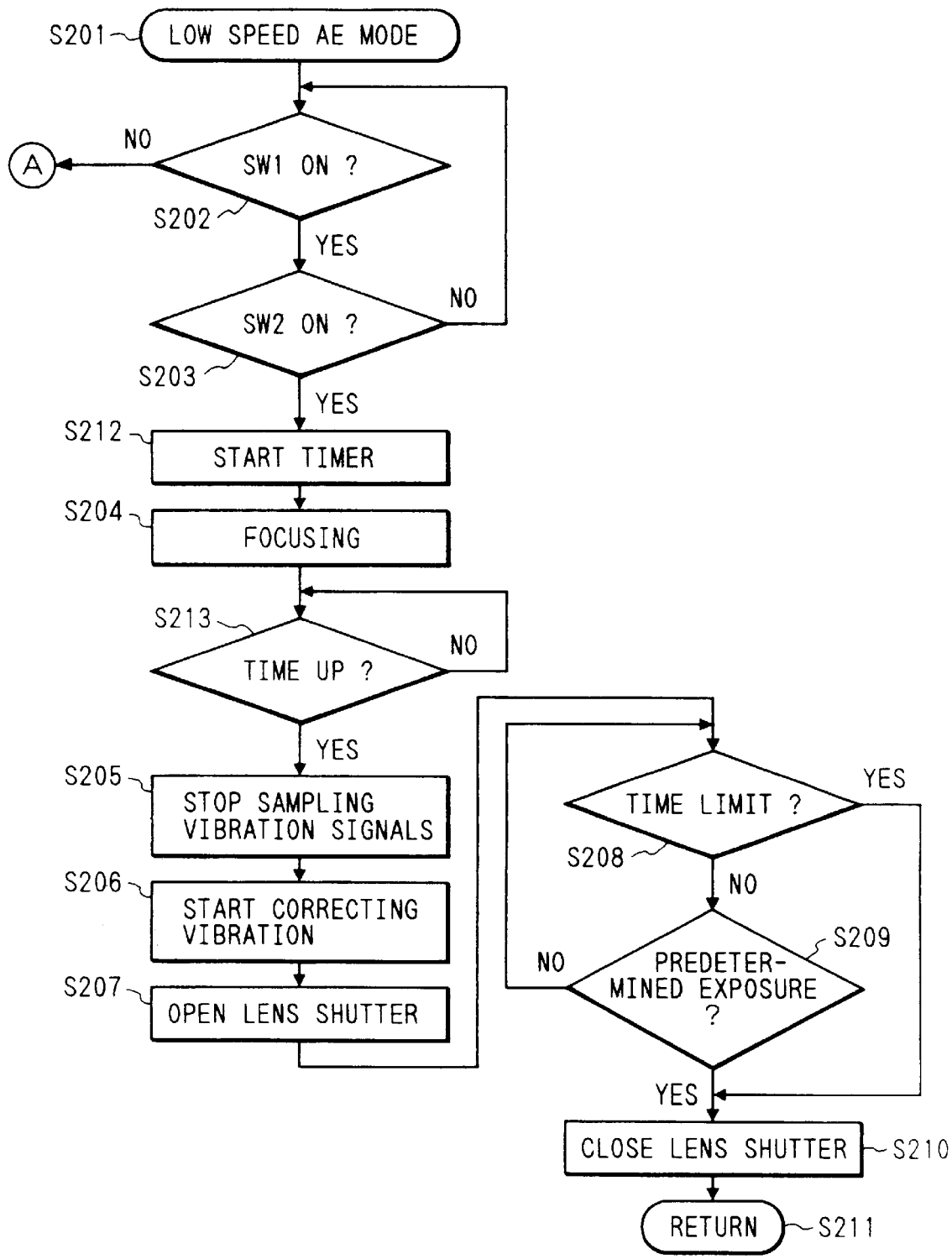

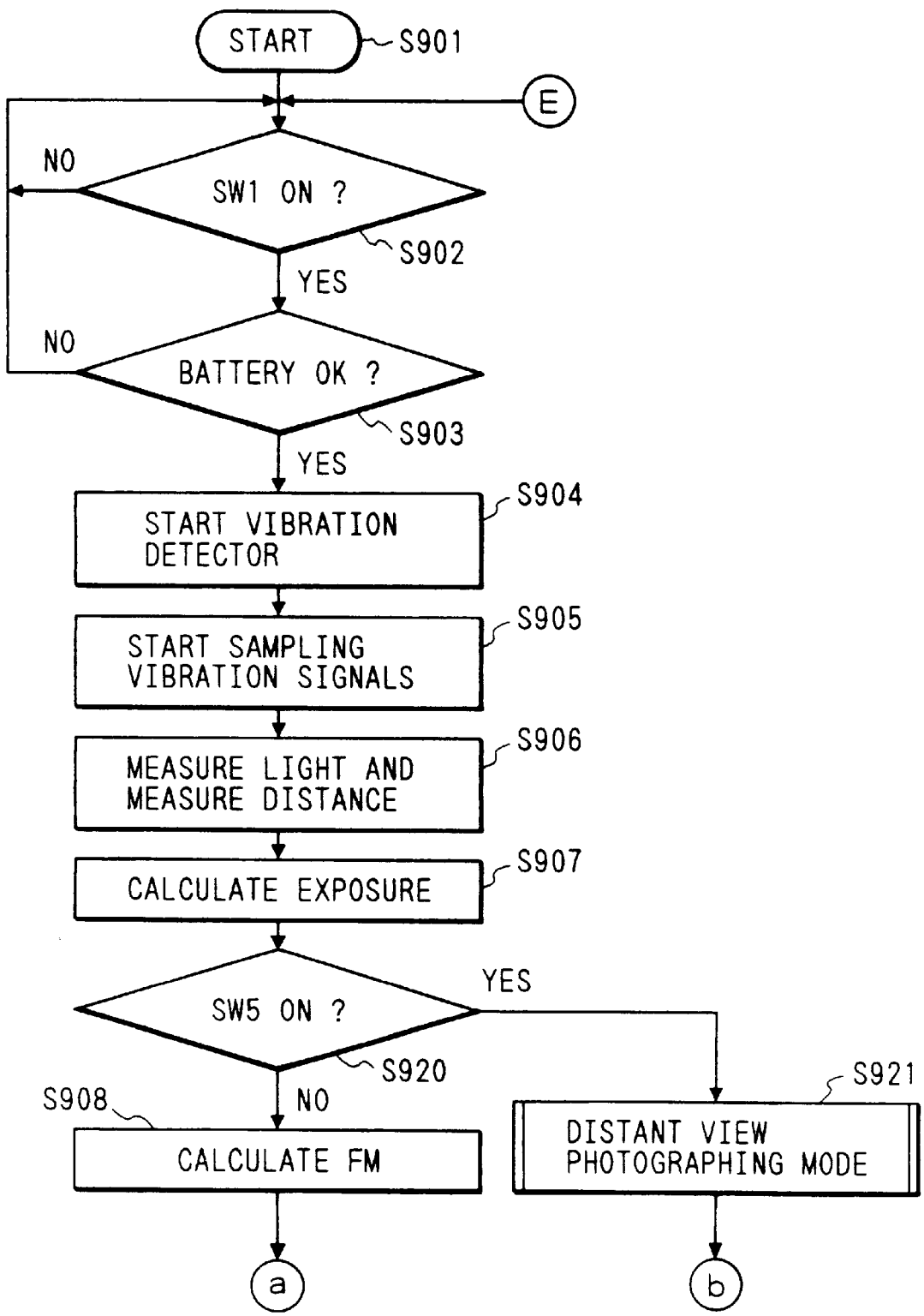

CAMERA HAVING VIBRATION CORRECTING DEVICE

This application is a continuation-in-part, continuation, division, of application Ser. No. 08/773,292, filed Dec. 24, 1996, now abandoned, which is a continuation application of Ser. No. 08/377,796, filed Jan. 24, 1995, now abandoned.

BACKGROUND OF THE INVENTION

1. Field of the Invention

The present invention relates to a camera having a vibration correcting device for correcting an image blur caused concomitantly with a camera shake or the like and a vibration correcting device incorporating a zoom photographic optical system.

2. Related Background Art

In a type of conventional camera having a vibration correcting device, as compared with a camera not having a vibration correcting device, a breakoff time of the shutter operation can be made closer to a slow shutter side by dint of action of the vibration correcting device. In a camera switchable over to a flashlight emitting mode and a flashlight inhibition mode, however, the breakoff time exists in each mode. But, there is no camera which deals with the breakoff time of the shutter operation in relation to both modes.

In the case of flashlight photographing, a flash duration of the electronic flash is short, and, hence, there is no problem in terms of a camera shake with respect to a principal object. When photographed by a considerably slow shutter, however, there arises a problem in which the background is blurred. Particularly when a comparatively strong camera shake is caused in a state where a partially bright portion exists on the background, there is produced such a problem that the light is superposed on the principal object, resulting in a photo which is hard to see.

Further, in a recent camera, the respective mechanisms such as an auto exposure (AE) mechanism, an autofocus (AF) mechanism, etc., are electronized and highly automated. One of such higher functions is a function to correct a vibration derived from the camera shake in the photographing of an object when holding the camera with hands, and a variety of functions are proposed.

By the way, the problem induced when correcting such an image blur is that a necessary vibration correcting accuracy probably can not be probably obtained depending on a photographing condition.

That is, in the conventionally known camera having the vibration correcting device, the simplest way of correcting the vibration due to the camera shake or the like is to click the shutter at a speed higher than a shutter speed substantially determined by an inverse number of a focal length of a photographing lens. It has been considered that the camera shake is thus prevented.

The above-mentioned conventional camera, however, causes inconveniences in the following cases and brings about a problem in which the necessary exposure photographing can not be adequately effected.

That is, when trying to take a photo by a telephoto lens, and if, for example, the focal length is 120 mm, the shutter has to be pressed at a shutter speed higher than approximately $1/125$ sec. The problem is that the photographing is impossible when getting dark.

Further, when performing the flashlight photographing, the flash duration of the electronic flash is short, and, therefore, there is no problem in terms of the camera shake with respect to the principal object. However, when photographed by the comparatively slow shutter, there exists the problem in which the background is blurred.

Especially when the relatively strong vibration is caused in the state where the partially bright portion exists on the background, the light is superposed on the principal object, resulting in the hard-to-see photo. For this reason, the arrangement is such that the shutter speed is not slower than the shutter speed in the vicinity of the above-stated inverse number of the focal length in the case of the flashlight photographing, too.

Namely, the problem inherent in the conventional camera is that it is impossible to take a proper photo including the background when photographed in a dark place. There exists a necessity for taking some measures to compensate.

Also, when photographing by use of a flashlight device, it can not be said that the photographing operation making full use of the background light takes place. Further, in a slow synchro mode, it is also impossible to take a natural photo which makes the most of the background, and such a point has to be taken into consideration.

Particularly, it is required that this type of camera be constructed to exhibit effects of the vibration correcting device even when photographing in a dark place. Furthermore, in the camera using a zoom lens, the photo has to be taken while effecting the zooming. It is desired that some measures for obviating the above problems are to be taken in view of these points.

Additionally, Japanese Patent Application Laid-Open No. 2-11683 discloses one of the conventional vibration correcting devices. The vibration correcting camera disclosed therein is constructed such that external light photographing is selected when making a determination of falling within a vibration correcting range, while the flashlight photographing is automatically selected when making a determination of being beyond the vibration correcting range.

In the above vibration correcting camera, a drive time TA of a vibration correctable limit shutter is predetermined. In a comparison of the above drive time TA with TV obtained from a result of a light measurement, if TV≦TA, the external light photographing is selected. If TA≧TV, there is made the determination of being beyond the vibration correcting range, and the flashlight photographing in a specified shutter drive time is to be selected. In this case, the vibration correcting device is not allowed to function in the flashlight photographing. Furthermore, in the case of a distance which is so long that a flashlight does not reach that distance when TV≧TA, the flashlight is not emitted, and, instead, the external light photographing is carried out. In this case also, the vibration correcting device is not allowed to function in the same way as with the above flashlight photographing.

Given, however, are the following problems inherent in the above-described conventional vibration correcting camera.

In the case of distant-view photographing wherein the flashlight is not reached, the vibration correcting device does not work, and hence there is a possibility in which a blurred photo is to be taken. Besides, in the case of the flashlight photographing, the vibration correction control is not performed, and, therefore, the shutter drive time is generally set to $1/60$ sec. as a measure for preventing the blurred photo. For this reason, it happens that an unnatural photo is taken with an underexposure of the background.

SUMMARY OF THE INVENTION

It is a primary object of the present invention, which was devised under such circumstances, to prevent a hard-to-see photo in which the light is superposed on a principal object in a state where a partially bright portion exists on the background of an object by setting a proper breakoff time even under such a condition as to cause a vibration strong enough to exceed a limit of a capability of a vibration correcting device when in flash synchro.

To accomplish the above object, according to a first aspect of the present invention, there is provided a camera comprising: a photographing auxiliary light emitting device; and a vibration detecting device; a vibration correcting device for correcting a vibration on the basis of a vibration signal given from the vibration detecting device. This camera is constructed so that when performing flash photographing while driving the vibration correcting device, a maximum shutter time in flash synchro photographing for emitting a flashlight in synchronism with a shutter is shorter than or equal to a maximum shutter time in a non-emission of the flashlight so as not to cause the photographing auxiliary light emitting device to emit the flashlight. A relationship therebetween is thus established.

The thus constructed camera having the vibration correcting device is capable of preventing the hard-to-see photo in which the light is superposed on the principal object in a state where the partially bright portion exists on the background of the object by setting the proper breakoff time even under such a condition as to cause the vibration strong enough to exceed the limit of the capability of the vibration correcting device when in the flash synchro.

It is another object of the present invention to obtain a camera having a vibration correcting device that is capable of obviating a problem in which the background is not photographed in the photographing in a dark place and in flashlight photographing, make it possible to photograph in the dark place and taking a natural photo by making the most of the background even in the flashlight photographing.

To accomplish the above object, according to a second aspect of the present invention, there is provided a camera having a vibration correcting device, comprising a zoom photographic optical system, a vibration correcting device, a light measuring device and a flashlight emitting device. The camera further comprises a control device for performing exposure photographing at a speed slower by at least one level than a shutter speed determined by an inverse number of a focal length. This control device is constructed to set a focal length serving as a basis for the shutter speed to a maximum or minimum focal length and make a breakoff time fixed when photographed irrespective of zooming by a photographing optical system.

According to the present invention, in the camera including the vibration correcting device, because of the property that the vibrations are not produced also at the time of the slow shutter, the slow restriction of the shutter speed is set to making it possible to photograph at the speed slower by at least one level than the shutter speed determined by the inverse number of the focal length for the purpose of clearly shooting the background in the normal photographing or flashlight photographing, and it is also possible to take photos in the dark place and with a well-depicted background.

Then, there is provided the vibration correcting camera capable of taking the natural photo with a proper exposure of the background of the object without sacrificing the background depiction and adequately selecting the shutter drive time.

To accomplish the above object, according to a third aspect of the present invention, there is provided a vibration correcting camera comprising a vibration detecting device for detecting a vibration of the camera, a vibration correcting device for correcting the vibration on the basis of a signal given from the vibration detecting device, a shutter control device for exposure-controlling a shutter device and a selecting device for selecting at least a first shutter drive time and a second shutter drive time longer than the first shutter drive time. The first shutter drive time is set to $\frac{1}{15}$ sec. or under.

According to the present invention, as described above, two kinds of vibration correctable limit shutter drive time for determining a vibration correcting range are prepared, one for a beginner and the other for an advanced photographer. The shutter drive time for the advanced photographer is set slower than the shutter drive time for the beginner. Accordingly, in the case of the distant-view photographing, there is specially provided a setting device dedicated to the distant-view photographing, and the vibration correctable limit shutter drive time for determining the vibration correcting range is oriented to the advanced photographer, while inhibiting an emission of the flashlight. Then, external light AE photographing is thus set. In this way, the vibration correcting operation is conducted regardless of the photographing modes (flashlight photographing, external light photographing and distant-view photographing), and therefore the photographer, whether the advanced or the beginner, is capable of taking the photo without considering the camera shake.

BRIEF DESCRIPTION OF THE DRAWINGS

Other objects and advantages of the present invention will become apparent during the following discussion in conjunction with the accompanying drawings, in which:

FIG. 3 is a flowchart showing a subroutine in a slow-speed AE mode according to the first embodiment of the present invention;

FIGS. 13A and 13B are flowcharts of a main routine showing an operating sequence by the CPU according to the third embodiment;

DESCRIPTION OF THE PREFERRED EMBODIMENTS

Embodiments of the present invention will hereinafter be discussed with reference to the drawings.

Figure 1:
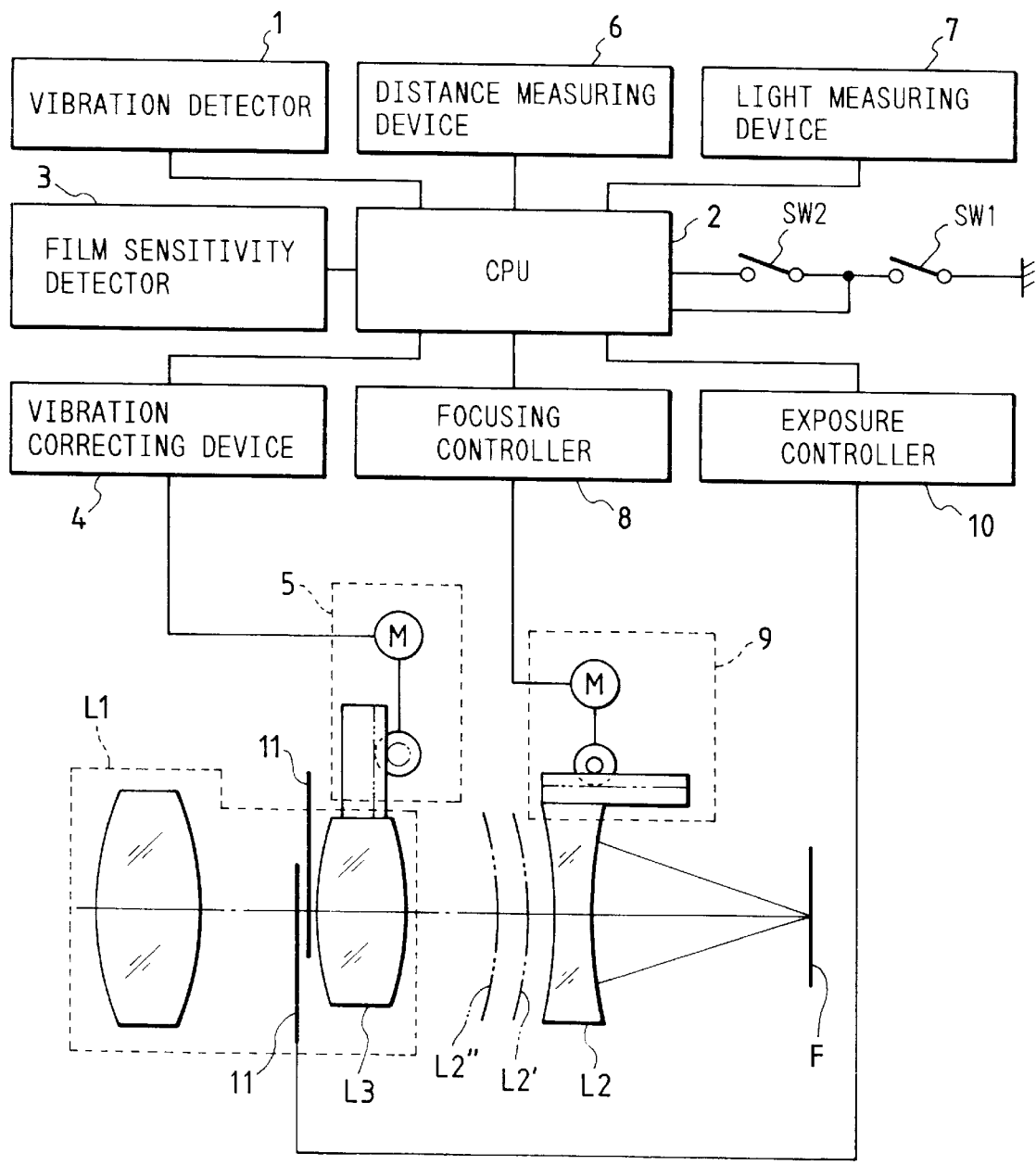
FIG. 1 is a block diagram illustrating a first embodiment of a camera having a vibration correcting device according to the present invention.

FIG. 1 is a block diagram illustrating a first embodiment of a camera having a vibration correcting device according to the present invention.

Referring to FIG. 1, a vibration detector 1 detects a state of vibrations caused concomitantly with a camera shake or the like. A half-press switch SW1 is turned ON by half-pressing an operation member, e.g., a shutter release button (unillustrated) mounted on an upper edge portion of the camera. A CPU 2 incorporated into the camera starts up this vibration detector 1. Besides, the vibration detector 1, after a predetermined time has elapsed, detects a vibration quantity of the camera body. The CPU 2 is employed as a vibration detection control device together with the half-press switch SW1 of the release button.

A film sensitivity detector 3 detects an ISO speed of a film loaded into the camera. A vibration correcting device 4 is provided into the camera. When a full-press switch SW2 is turned ON by full-pressing the unillustrated release button, the CPU 2 commands the vibration correcting device 4 to correct the vibration on the basis of the vibration quantity detected by the vibration detector 1. The vibration correcting device 4 drives a drive system of a part (vibration correction optical system L3) of a photographic optical system L1, thereby shift-driving the vibration correction optical system L3 in up-and-down directions (perpendicular to the optical axis) in the Figure. An image blur of an object image on a film surface F through the photographic optical system as a whole is thus corrected.

A distance measuring device 6 measures a distance to the object. A light measuring device 7 measures a brightness of the object. The CPU 2, upon the half-press operation (SW1 is turned ON) of the release button, starts up the distance measuring device 6 and the light measuring device 7. When started up, these devices 6, 7 respectively execute the measurements of the distance and the lighting as well.

The numeral 8 designates a focusing controller 8. The CPU 2 commands the focusing controller 8 to perform autofocusing in accordance with an output (result of distance measurement) signal of the distance measuring device 6. In response to this command, the focusing controller 8 drives a focusing optical system L2 through a drive system 9 (focusing device) of the focusing optical system L2, thus effecting the autofocusing.

The CPU 2 commands an exposure controller 10 to control a stop corresponding to a stop value. In response to this command, the exposure controller 10 drive-controls the stop member 11 serving also as a shutter (hereinafter termed a lens shutter), thus controlling the exposure.

Next, the operation of the CPU 2 will be explained with reference to a flowchart of FIGS. 2A and 2B.

Figure 2A:
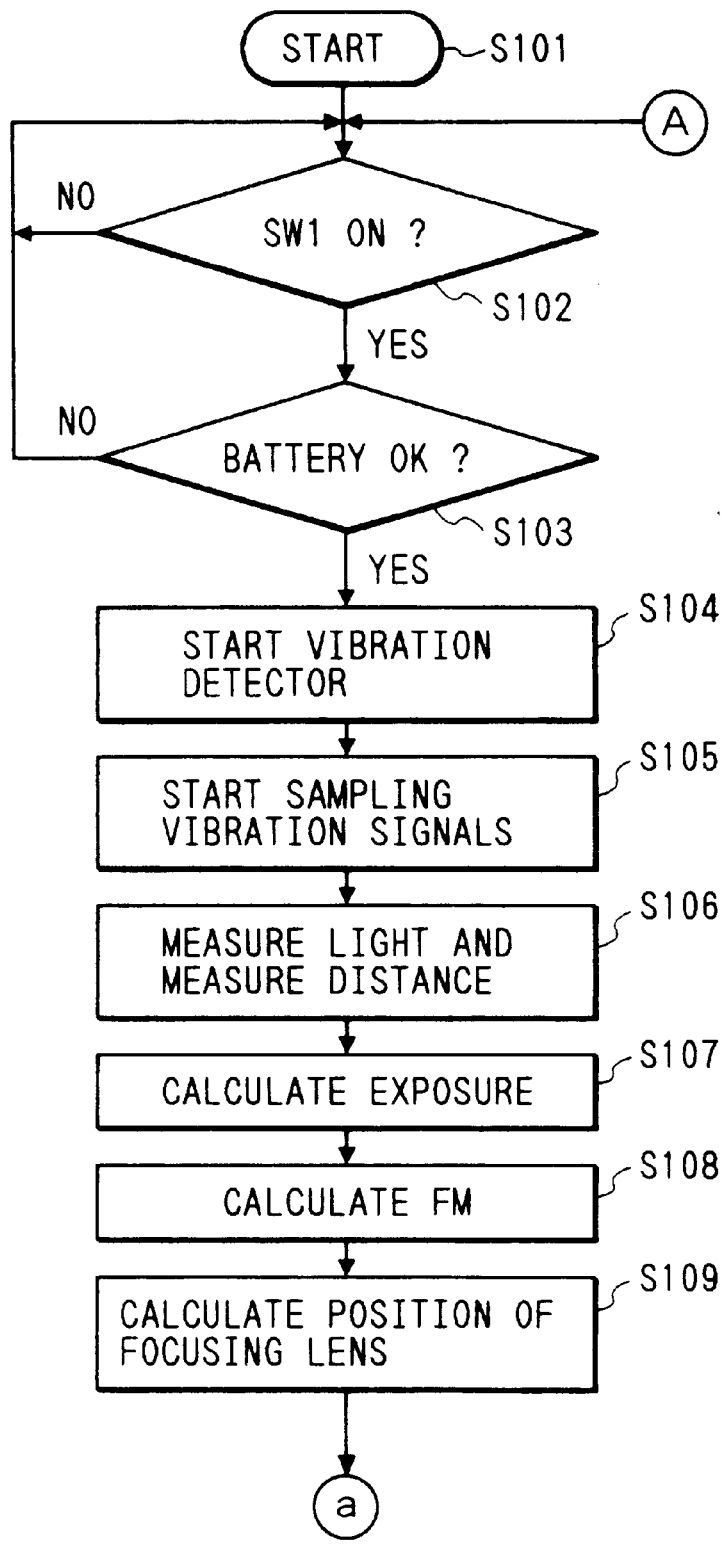
FIGS. 2A and 2B are flowcharts of a main routine according to the first embodiment of the present invention.

In a state where a main power switch of the camera is turned ON, when half-pressing the release button, the processing proceeds from step S101 to S102 in FIG. 2A. When turning ON the switch SW1, the processing goes to step S103, wherein the CPU 2 checks whether a battery has sufficinet power.

Further, when determining that the battery is sufficient, the processing proceeds to step S104 in which the vibration detector is started up. Further, in step S105, sampling of a vibration signal outputted from the vibration detector is preformed.

Then, the processing moves to step S106, wherein the light-and-distance measurements of the object are carried out. Next, in step S107, an exposure is calculated. After obtaining an item of data indicating whether or not photographing is performed in an SB (electronic flash) mode, an FM (flashmatic) arithmetic operation is conducted, in step S108 thus determining the stop value when in the SB flashing.

A focusing lens position is calculated from the result of the distance measurement in step S109. In step S110, whether in an SB flashlight photographic state or not is determined in the SB mode discriminating step shown in FIG. 7. In step S111, if the SB flashlight is needed, and when the result of the distance measurement in step S106 is larger than a predetermined value A, the photographic operation set in a low-speed AE mode in step S112 is carried out. Whereas if smaller than the predetermined value A, whether set in an SB flashlight inhibition mode or not is determined through a selection by an outside operation switch in step S113. If in the SB flashlight inhibition mode, the operation is set in the low-speed AE mode of step S112. Whereas if not in the SB flashlight inhibition mode, the processing proceeds from step S113 to step S114, wherein whether in a slow synchro mode or not is determined. If set in the slow synchro mode, the photographing is conducted in the slow synchro mode of S116. Whereas if not in the slow synchro mode, the processing moves to step S115, wherein the photographing is conducted in the SB mode.

When determining that the SB flashlight is unnecessary in step S110, the processing proceeds to step S118, wherein it is determined whether the camera is in a forcible SB mode or not through the selection by the outside operation switch. If in the forcible flashing, the mode turns out the SB mode in step S115. Whereas if not, the operation is set in a high-speed AE mode in step S119, thereby performing the photographing.

After finishing each mode, the film is wound up by one frame in step S117, thus finishing the operation.

Figure 2B:
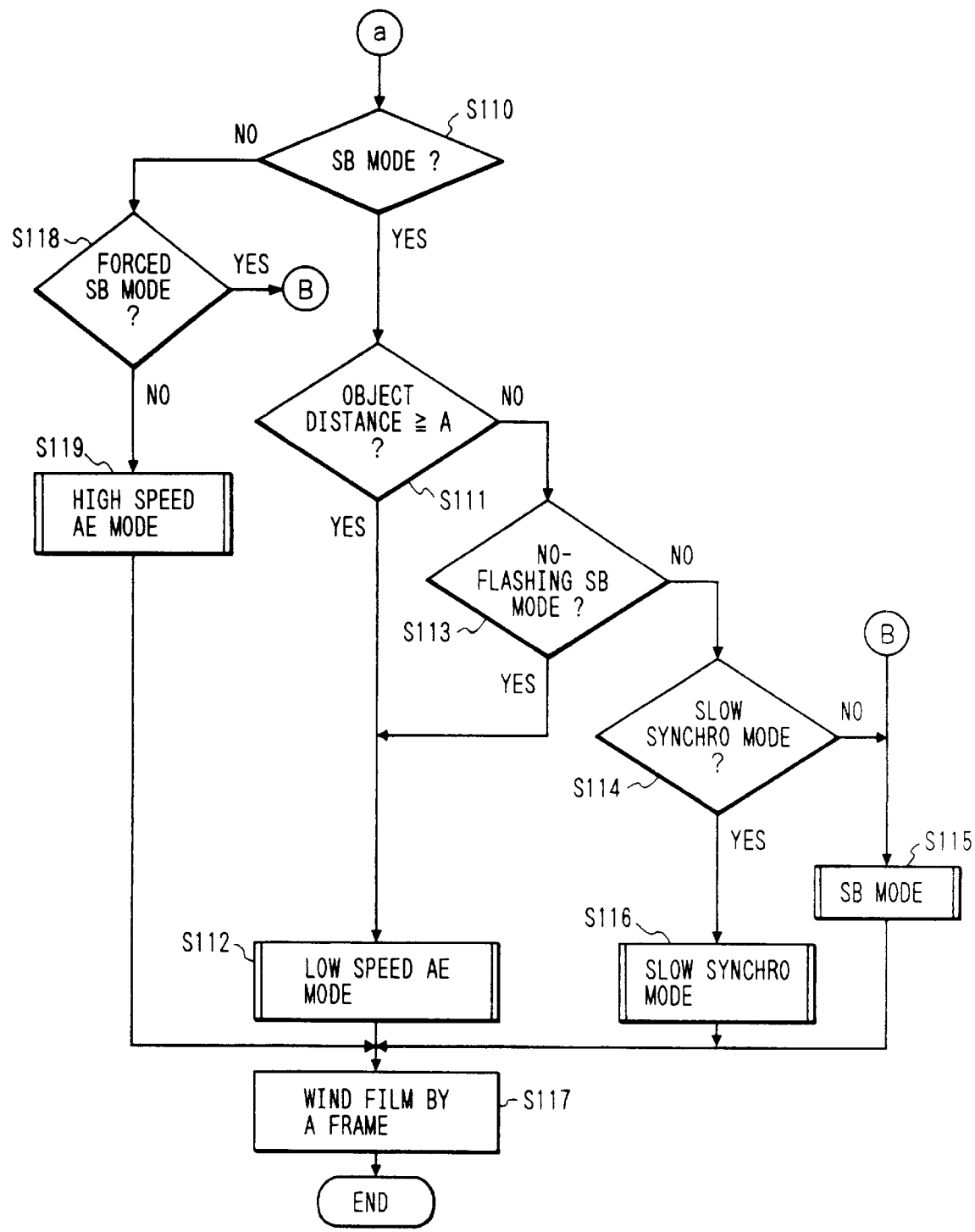

FIG. 3 shows the operation in a low-speed AE mode (S112 in FIG. 2B). The operation enters the low-speed AE mode in step S201, and whether or not the half-press switch SW1 of the release button is turned ON is determined in step S202.

Herein, if the switch SW1 is not turned ON, the processing goes back to step S102 in FIG. 2A.

Further, when the half-press switch SW1 is turned ON, the processing proceeds to step S203, wherein it is determined whether the release button is fully pressed or not. If fully pressed, the processing goes to step S212, wherein a timer is started.

Next, the processing proceeds to step S204 in which the drive system 9 (see FIG. 1) shifts the focusing optical system L2 conceived as a focusing lens on the basis of the value calculated in step S109.

Herein, if the result of the distance measurement is large, the focusing optical system L2 is shifted to a position L2" in FIG. 1. Whereas if the result of the distance measurement is small, the focusing optical system L2 is shifted to a position L2'. A shift quantity becomes larger with a longer distance, and a focusing time also increases.

Herein, a shifting mechanism drives, as indicated by the numeral 9 in FIG. 1, a stepping motor M to shift the focusing optical system L2 in the optical-axis direction through a rack pinion.

In step S213, after the focusing operation has been ended, whether a predetermined time elapses or not is determined. When determining that the predetermined time has elapsed in step S213, the sampling of the vibration signal is finished in step S205. In step S206, a determination fiducial value for the calculation of the vibration quantity is arithmetically obtained, and a present vibration quantity is calculated. The vibration correcting device 4 is driven based on the thus calculated vibration quantity, thereby starting a vibration correcting operation of the vibration correction lens L3.

Performing this vibration correcting operation involves rotating, e.g., the motor M in accordance with the vibration quantity and shifting the vibration correcting lens L3 in a direction orthogonal to the optical axis through the rack pinion.

Next, the lens shutter 11 starts opening in step S207. In step S208, a limiter, i.e., a breakoff time (a time limit) is determined so as not to be longer than a predetermined shutter time. Hence, if over this limiter, the processing proceeds to step S210 to close the lens shutter 11.

Whereas if the predetermined shutter time is not reached, whether or not the value comes to a proper exposure value calculated in step S107 is determined in step S209. If it becomes the proper value, the processing proceeds to step S210, wherein the lens shutter 11 is closed. Then, in step S211, the processing returns to the main routine in FIGS. 2A and 2B.

Figure 4:
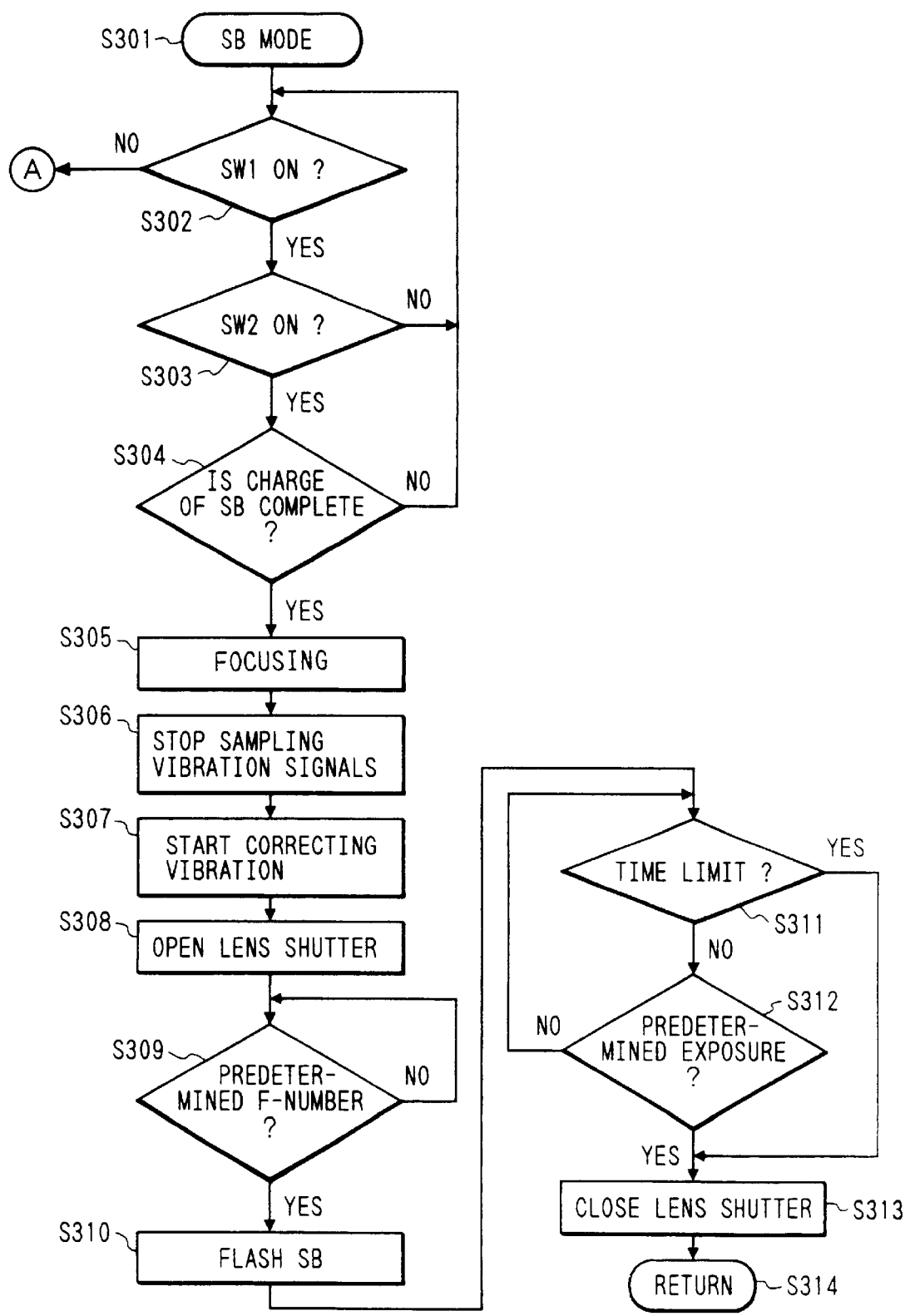
FIG. 4 is a flowchart showing a subroutine in an SB mode according to the first embodiment of the present invention.

FIG. 4 shows the operation in the SB mode (S115 in FIG. 2B). In step S301, the operation enters the SB mode. This mode is relative to a case where the limiter is shorter than a limiter in the AE mode.

The SB mode in steps S301–S303, ON-check of the switch SW1 and the ON-check of the switch SW2 are the same as those in above-mentioned steps S201–S203 in FIG. 3. In step S304, a charging state of the electronic flash is determined. If the charging is not yet completed, the processing goes back to step S302. Further, the focusing in steps S305–S308, the finishing of the sampling of the vibration signal, the starting of the vibration correction and the opening of the lens shutter are substantially the same as those in steps S204–S207 in FIG. 3 except that a timer count is not conducted.

Determined in step S309 is whether or not the lens shutter 11 serving as the stop member comes to a predetermined f-number. When reaching the predetermined f-number (arithmetic result in S108), the electronic flash emits the flashlight in step S310.

Note that the breakoff time check in steps S311–S314, the predetermined exposure check, closing the lens shutter and returning are the same as those in steps S208–S211 in FIG. 3, and, hence, their detailed explanations will be omitted.

Figure 5:
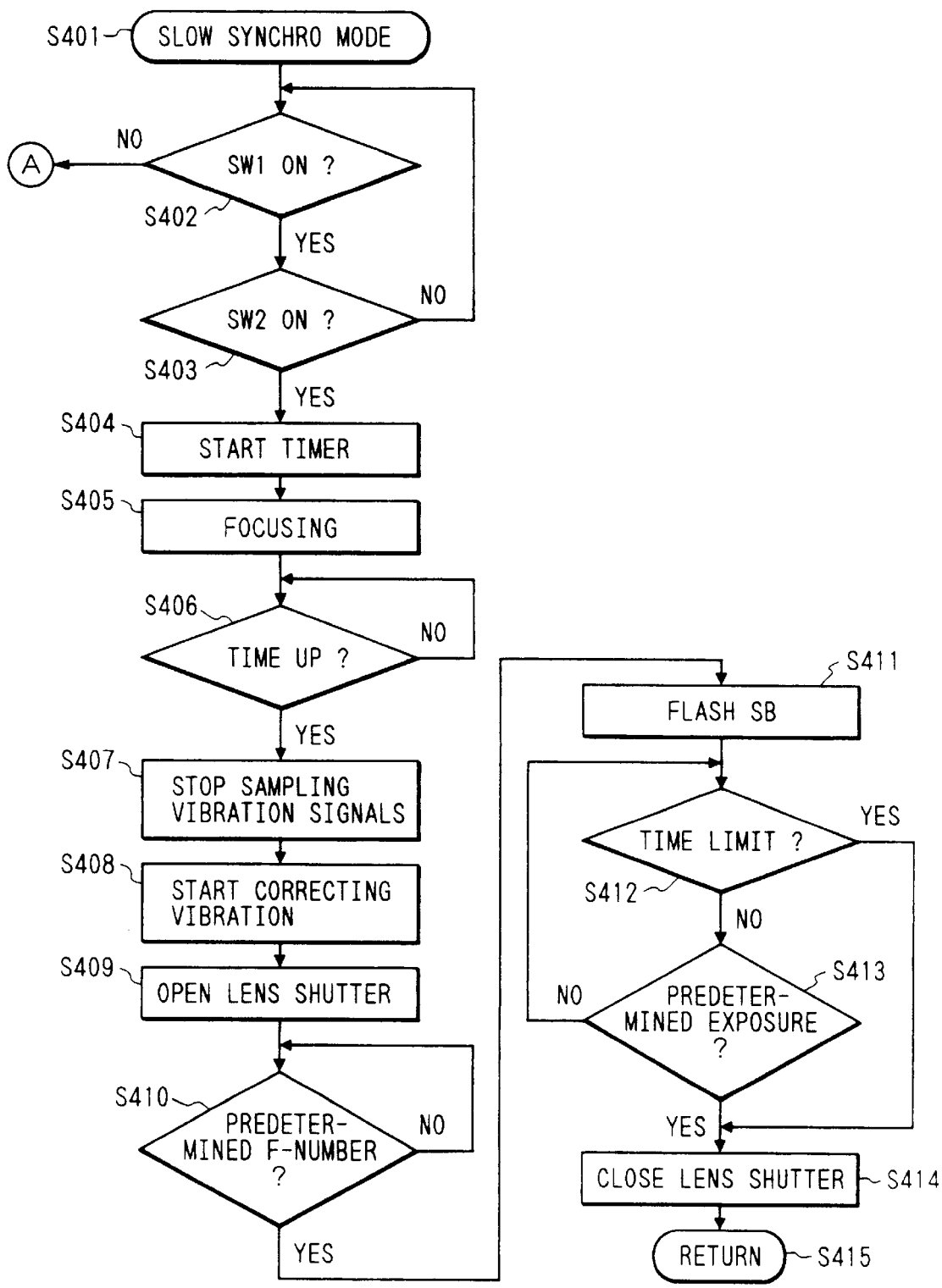
FIG. 5 is a flowchart showing a subroutine in a slow synchro mode according to the first embodiment of the present invention.

FIG. 5 shows the operation in the slow synchro mode (S116 in FIG. 2B). In this mode, a limiter is the same as the limiter in the AE mode.

Herein, the slow synchro mode in steps S401–S409, the ON-check of the switch SW1, the ON-check of the switch SW2, the starting of the timer, the focusing, a time-up, the finishing of the sampling of the vibration signal, the starting of the vibration correction and the opening of the lens shutter are the same as those in above-stated steps S201–S207 (including the timer count control in steps S212, S213) in FIG. 3, and hence the explanations thereof will be omitted.

Further, in steps S410–S415 the check of the predetermined f-number, the flashing by the electronic flash, the check of the breakoff time, the predetermined exposure check, the closing of the lens shutter and the returning are the same as those in above-described steps S309–S314 in FIG. 4, and simply, the limiter is longer than in the SB flashlight mode.

Figure 6:
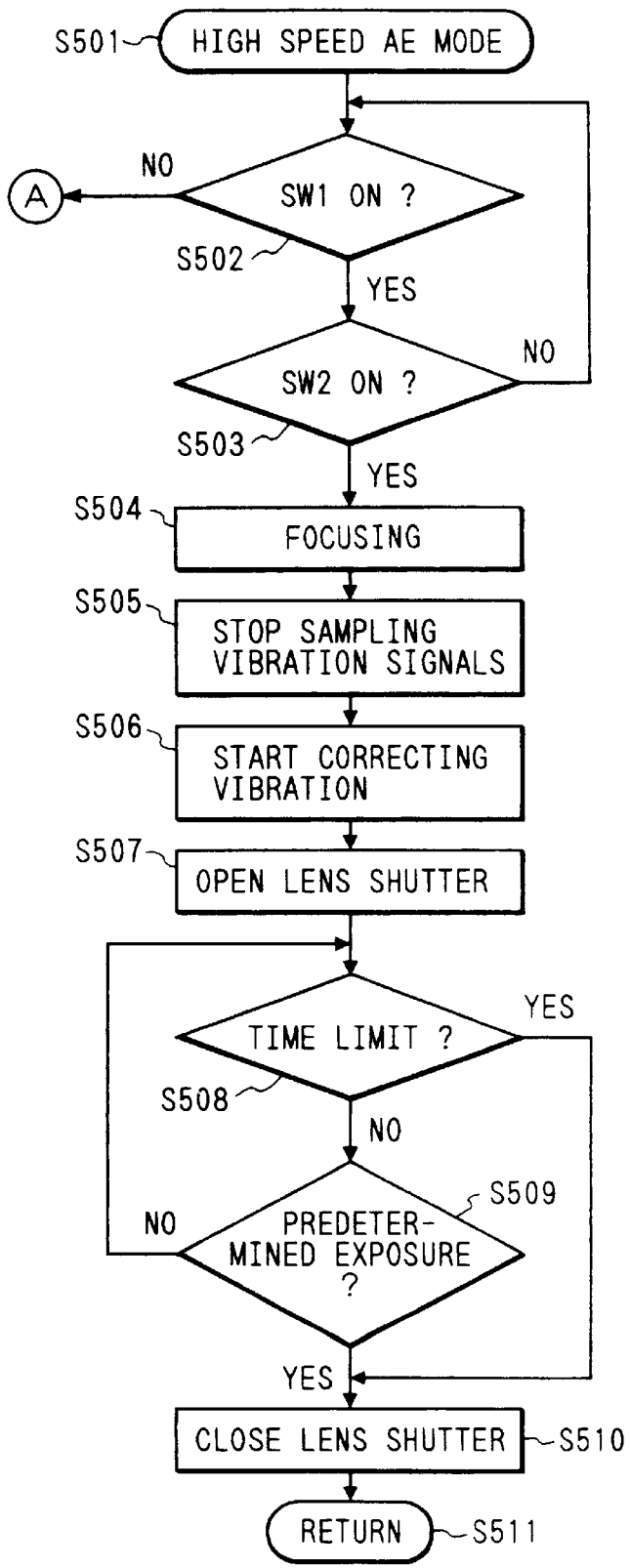
FIG. 6 is a flowchart showing a subroutine in a high-speed AE mode according to the first embodiment of the present invention.

FIG. 6 shows the operation in the high-speed AE mode (Sll9 in FIG. 2B). An outline of the operation in this mode is substantially the same as that in the above-stated low-speed AE mode in FIG. 3, except that there is no timer count control in steps S212, S213, Setps S501 through S511 are the same as the respective steps S201 through S211 in FIG. 3 and, therefore, the detailed explanations will be omitted.

Figure 7:
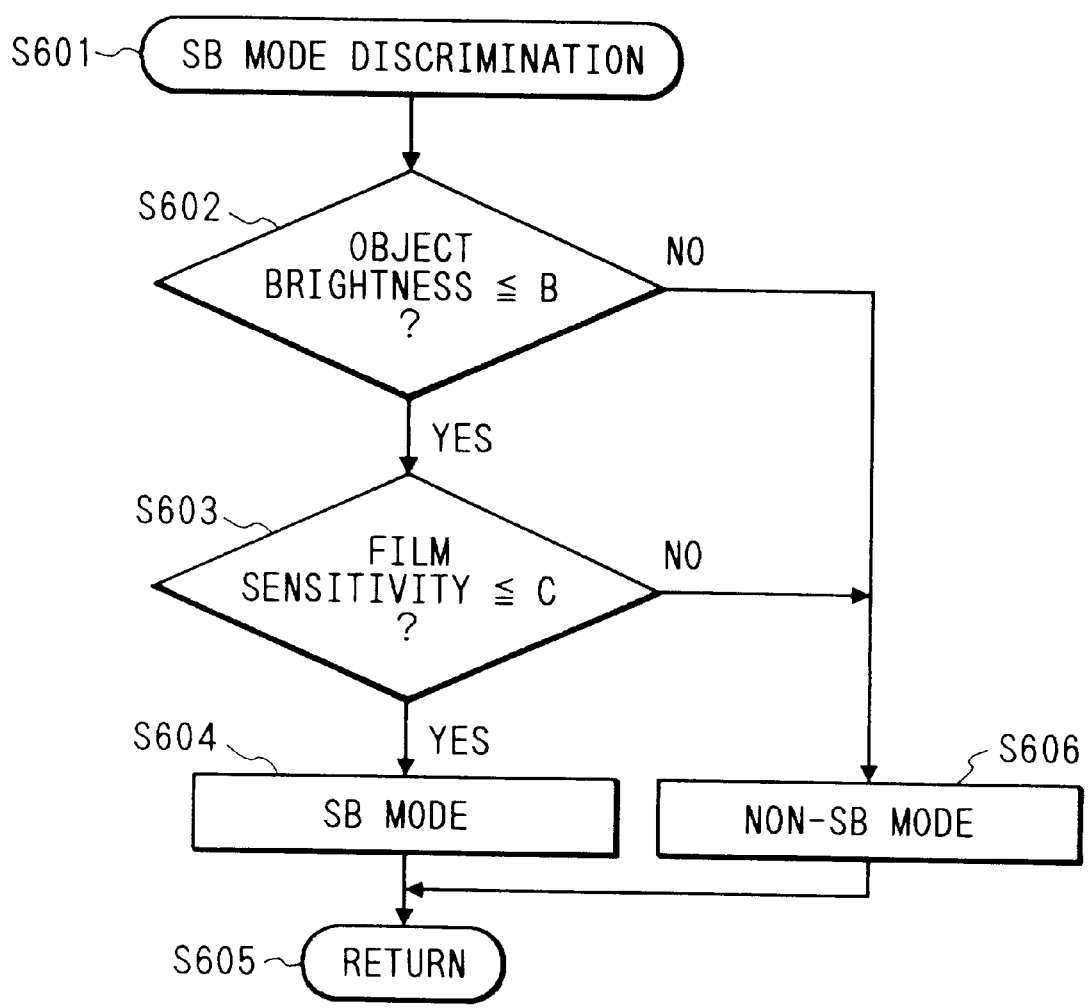
FIG. 7 is a flowchart showing a subroutine for an SB mode discrimination according to the first embodiment of the present invention.

Herein, referring to FIG. 7, according to an SB mode discrimination (S110 in FIG. 2B) in S601, as obvious from FIG. 7, the following will be readily understood. Whether or not the object brightness is smaller than a predetermined value B is determined in step S602. If larger than the value B, the processing jumps to step S606 wherein the operation is set in a non-SB mode. The processing is returned in step S605. On the other hand, when determining that the object brightness is substantially equal to or smaller than the predetermined value B, a film sensitivity (ISO) is compared with a predetermined value C in step S603. The SB mode is, it can be easily understood, selected in step S604 when equal to or smaller than the value C.

Note that the present invention is not confined to the above-discussed embodiment, but the configurations of the respective elements can be, as a matter of course, properly varied and modified.

For example, in the above-discussed embodiment, the vibration detection fiducial value is calculated by the CPU 2 in interlock with the half-press switch SW1 of the release button. The calculation thereof is not limited to this but may be done by providing a dedicated switch operation member.

Figure 8:
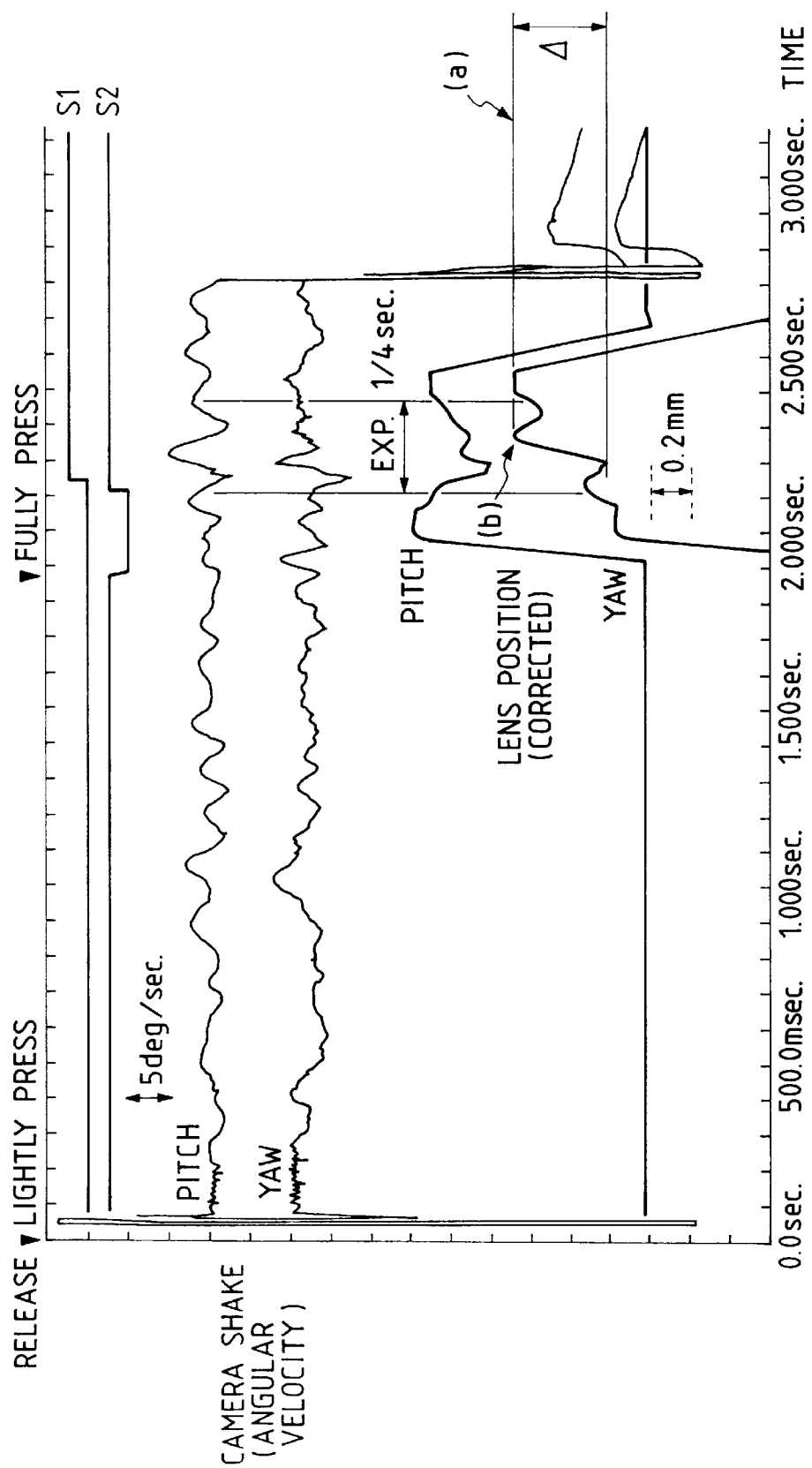
FIG. 8 is a characteristic diagram according to the first embodiment of the present invention.

FIG. 8 illustrates an output waveform of a vibration reduction sensor (vibration detector 1) and an operating waveform of a shift lens (vibration correcting optical system L3). A signal S1 shown in the upper portion in FIG. 8 indicates a state of the half-press switch SW1, wherein the switch SW1 is in the ON-state when the line is lowered but in the OFF-state when the line rises. Also, a signal S2 indicates a state of the full-press switch SW2, wherein the switch SW2 is in the ON-state when the line is lowered but in the OFF-state when the line rises. The symbol [CAMERA SHAKE] illustrates an output waveform of an angular velocity sensor (vibration detector 1). The output diverges in two directions PITCH and YAW. The symbol [LENS POSITION] indicates a position of the shift lens (vibration correcting optical system L3). The position of the shift lens (vibration correcting optical system L3) is obtained by integrating the output of the angular velocity sensor (vibration detector 1) and is thus controlled. Paying attention to a shift lens position in the YAW-direction, it takes the maximum value Δ of a lens moving quantity during an exposure time (indicated by a width EXP, and, herein, 1.4 sec.). When an upper limit lens position is indicated by (a), the waveform immediately after closing the shutter assumes a linearity and thus coincides with (a). Also, at a point (b) for the duration of the shutter exposure, this coincides with the line (a). This line (a) is determined based on the control of a control circuit in terms of the lens optics. That is, this is the maximum value of the vibration correction quantity.

The maximum value of the vibration shift quantity is proportional to the exposure time. Namely, when the exposure time increases, the maximum value of the vibration shift quantity increases. This is also obvious from FIG. 8. When the exposure time increases in the YAW waveform, the shift lens position is on the rise above the line (a) but reaches the limit, resulting in no effect in terms of the vibration reduction. That is, in the camera illustrated in this embodiment, the value of the maximum exposure time is, valid, or preferably set at ¼ sec.

Table 1 gives a specific example of the breakoff time shown in FIG. 8.

TABLE 1

[Telephoto/Wide Angle] Focal Length 105 mm →
Camera Shake Limit Speed ¹⁄₁₀₅ sec.

| VR | SB Mode | | |
|---|---|---|---|
| | Auto | Slow Synchro | Off |
| ON | ⅕ sec. | ¼ sec. | ¼ sec. |
| OFF | ¹⁄₆₀ sec. | ¹⁄₁₅ sec. | ¼ sec. |

Referring to Table 1, in a relationship of the maximum shutter time during flash synchro photographing versus the maximum shutter time during non-flashing of the electronic flash, the maximum shutter time during the flash synchro photographing is set smaller than or equal to the maximum shutter time during the non-flashing of the electronic flash.

That is, when the vibration reduction device (vibration correcting device 4) VR is switched ON (1st row), the slow synchro breakoff time is set at ¼ sec., and the flash-off breakoff time is also set at ¼ sec. The slow synchro breakoff time and the flash-off breakoff time are equalized to each other. Note that there may be set a relationship such as slow synchro breakoff time ≦ flash-off breakoff time. Further, the shutter breakoff time differs according to the SB auto mode and the slow synchro mode. The shutter breakoff time may be, however, the same both in the auto mode and in the slow synchro mode when switching ON the vibration reduction device VR.

When the vibration reduction device (vibration correcting device 4) VR is switched OFF (2nd row), as in the same way with the conventional camera including no vibration reduction device, the breakoff time during the slow synchro mode is set at ¹⁄₁₅ sec. Further, the breakoff time is, when switching OFF the electronic flash, set at ¼ sec. in consideration of photographing with a tripod. The principal object is illuminated with the flashlight of the electronic flash during the flash synchro mode and therefore photographed more sharply than in the flashlight inhibition mode. If a beam of intensive light, such as a light source, further exists on the background, the blur becomes more conspicuous, and, hence, the shutter speed in the flash photographing mode in the vibration reduction photography should not be made higher than in the flashing inhibition mode.

As discussed above, according to the present invention, even in such a condition that a vibration enough to exceed the limit of the capability of the vibration is strong reduction device in the flash synchro mode, the proper breakoff time is set. With this setting, it is possible to prevent a blurred-photo because of the light being superposed on the principal object even in a state where a partially bright portion exists on the background of the object.

Figure 9:
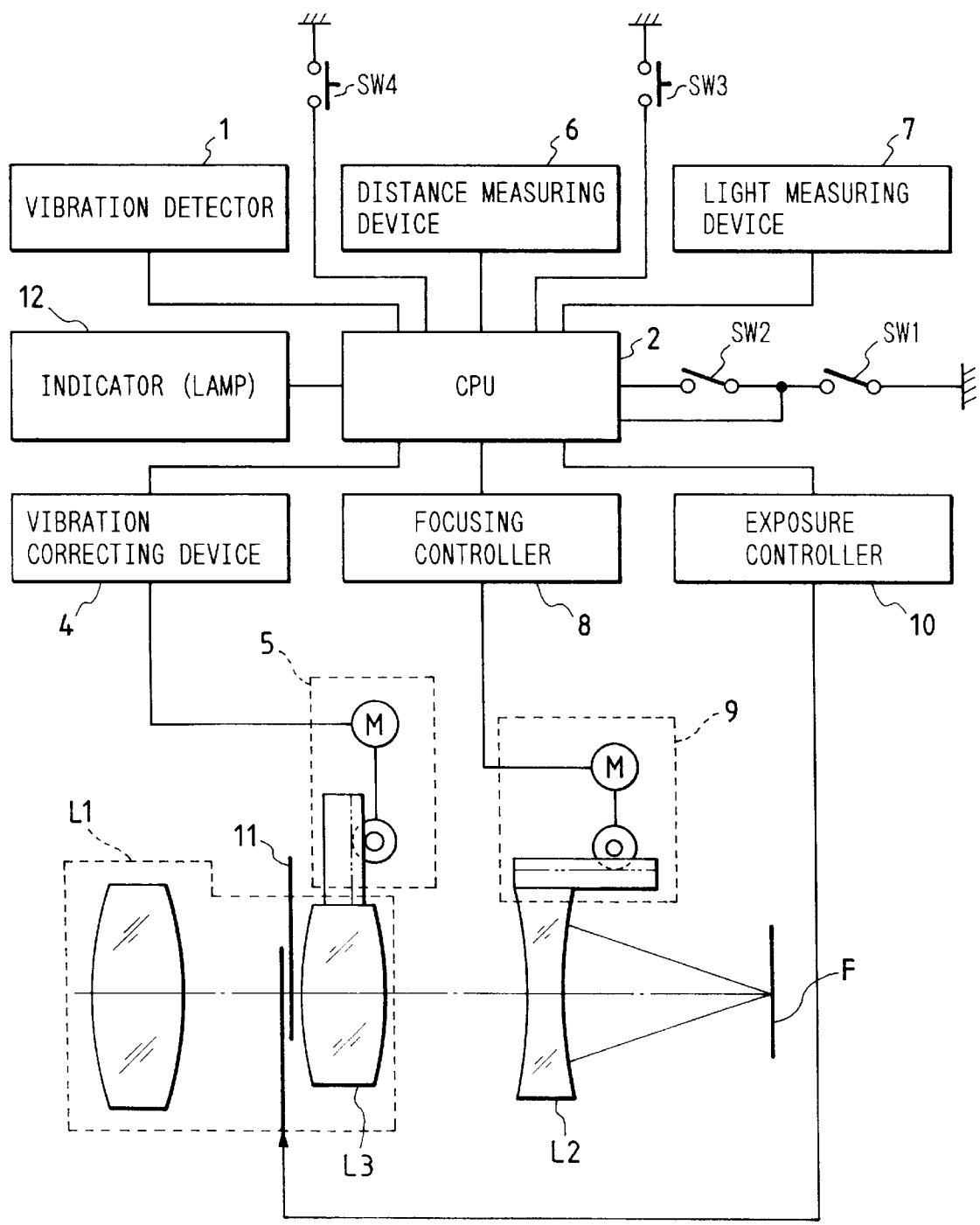
FIG. 9 is a block diagram of a control mechanism illustrating a second embodiment of the camera having a vibration correcting device according to the present invention.
Figure 10A:
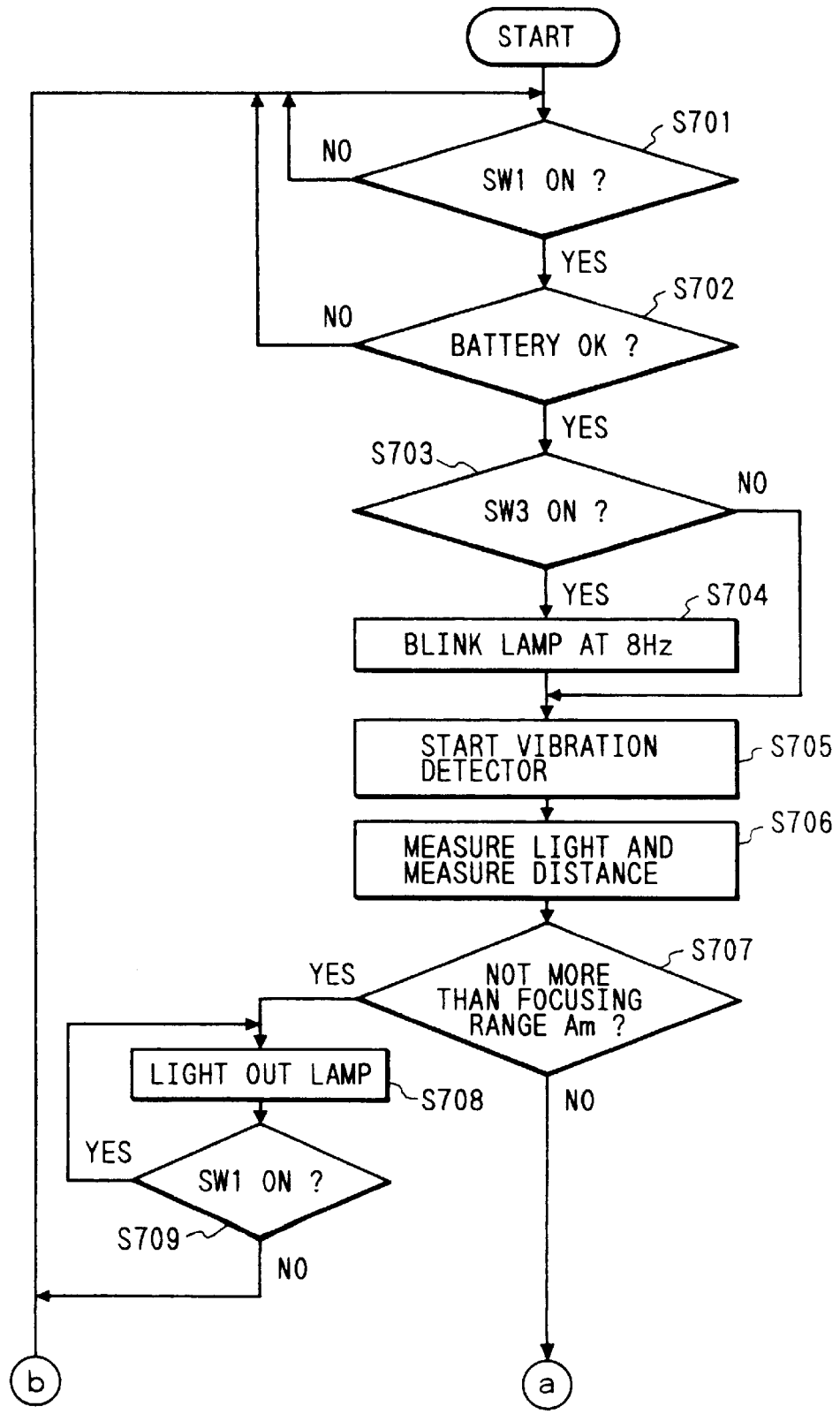
FIGS. 10A and 10B are flowcharts of assistance in explaining a control operation of a CPU but illustrates a third embodiment of the camera having a vibration correcting device according to the present invention.
Figure 10B:
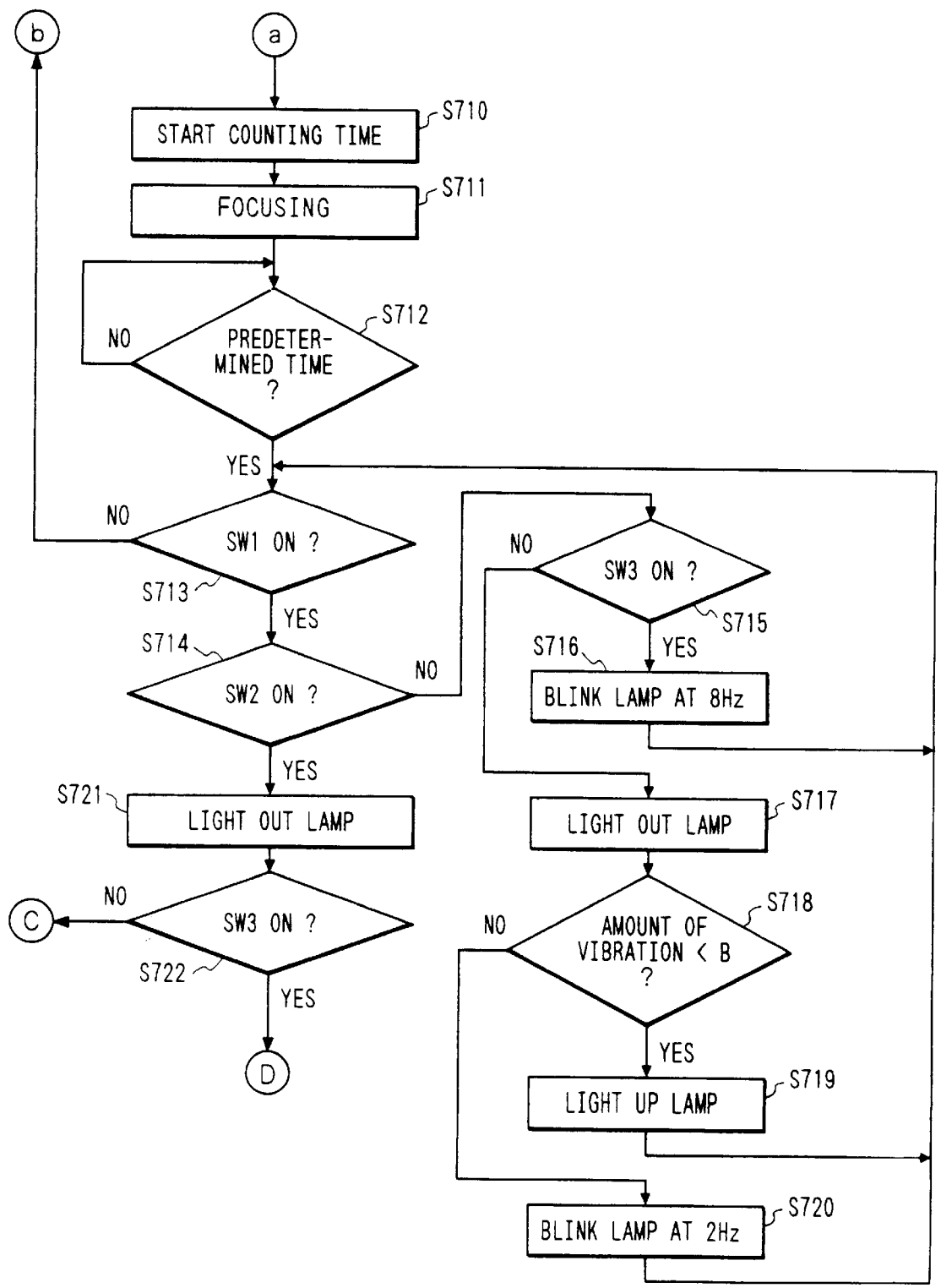
Figure 11:
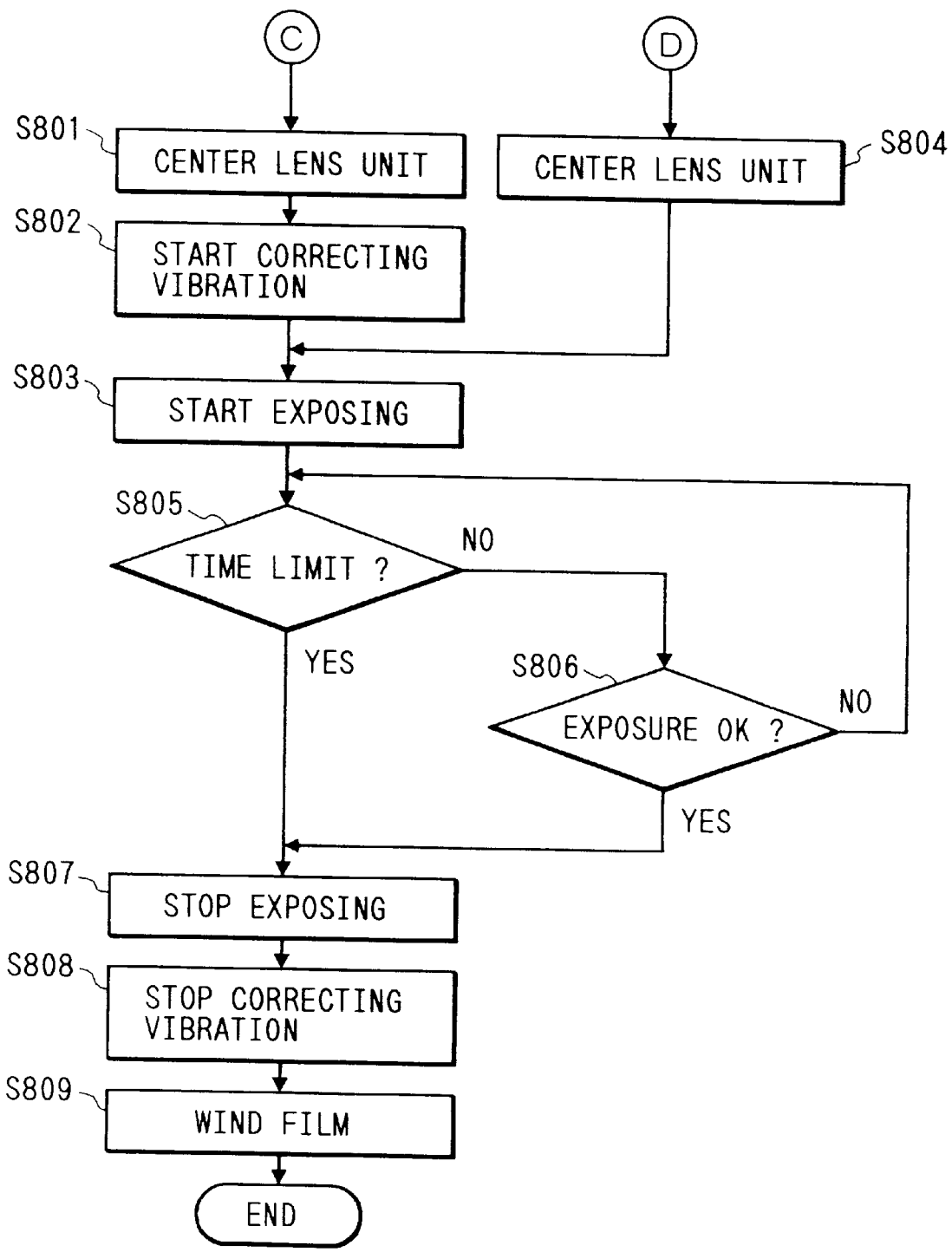
FIG. 11 is a flowchart, continued from FIG. 10B, of assistance in explaining the control operation of the CPU.

FIGS. 9 to 11 illustrate a second embodiment of the camera having the vibration correcting device according to the present invention. Referring first to FIG. 9 among these Figures, an outline of an internal structure of the camera to which the second embodiment is applied will be explained.

The same configurations as those shown in FIG. 1 are marked with the like numerals in FIG. 9, and the explanations thereof will be omitted.

An indicator 12 serving as an alarm indicating device includes of a lamp (or LEDs) provided in a finder of the camera. The CPU 2 blinks or extinguishes the lamp 12 in accordance with a start-up or an output signal of the vibration detector 1. Herein, the lamp-assisted indicator 12 and the CPU 2 are combined to constitute an alarm indication controller.

That is, when the half-press switch SW1 is turned ON by half-pressing the release button, the CPU 2 blinks the lamp serving as the indicator 12 simultaneously with the start-up of the vibration detector 1. Further, after the predetermined time has elapsed, in accordance with the output of the vibration detector 1, and when a vibration quantity of the camera body that is detected by the detection signal thereof is less than a predetermined quantity, the CPU 2 lights up the lamp 12 in a second state. The photographer himself or herself is able to determine whether the camera is in a vibration correctable range or not depending on the blink or light-up of the lamp 12 when taking a photo.

Note that the indicator 12 is not confined to the lamp provided in the finder or at the peripheral portion thereof but may be an indicator such as a lamp or LEDs provided on the rear surface of the camera body but in the vicinity of a finder window, e.g., located within a visual field of the photographer, including an interior of the finder visual field.

The CPU 2 determines the shutter time from a result of the light measurement by the light measuring device 7. When the shutter time is larger than the predetermined value, or when a switch SW3 which will be mentioned later is brought into the ON-state, the lamp of the indicator 12 is blinked simultaneously with the start-up of the vibration detector 1 by turning ON the switch SW1 upon half-pressing the release button. Further, the CPU 2, when determining that the vibration quantity of the camera body is smaller than the predetermined quantity from the output signal of the vibration detector 1, lights up the lamp of the indicator 12.

Referring to FIG. 9, the vibration correction stop switch SW3 serves as a vibration correction stop device so mounted on a part of the camera body as to be operable from outside. This vibration correction stop switch SW3 is turned ON when depressing, e.g., a switch button and remains in the ON-state while the depressed-state is maintained but turned OFF when taking the finger off the button. Then, when this switch SW3 is in the ON-state (closed-state), the drive control of the vibration correcting device 4 is inhibited on the basis of the output signal of the vibration detector 1, thus prohibiting the vibration correcting operation.

Herein, even when this vibration correction stop switch SW3 is turned ON, it may be preferable that the vibration quantity is continuously detected without inhibiting the operation of the vibration detector 1. It is because the detection of the vibration quantity takes a considerable time till the vibration quantity becomes detectable from the time the device has been started up.

Further, when operating this vibration correction stop switch SW3, this state may be displayed on the indicator 12 serving as the alarm indicating device for indicating an alarm through visual flashing and a blink signal.

Also, the symbol SW4 in FIG. 9 represents a flash mode switch interlocking with a setting button for setting the flash mode among the setting buttons for setting photographing modes of the camera. This switch SW4 switches over the flash mode such as SB auto mode—flashing inhibition mode—slow synchro mode for every pressing operation.

The modes set by this flash mode switch SW4, i.e., the states where, e.g., the SB auto mode and the SB slow synchro mode are set, may be displayed on the above indicator 12 or other display unit such as a display panel by lighting up these states with [AUTO], [SLOW], etc.

FIGS. 10A, 10B and 11 are flowcharts in explaining the operation of the CPU 2 of FIG. 9. The operation thereof will be explained in sequence.

Referring to FIGS. 10A and 10B, when starting the program, a half-press (the switch SW 1 is turned ON) of the release button is determined in step S701. Then, if the switch SW1 is turned ON, the processing proceeds to step S702. Whereas if the switch SW1 is turned OFF, the processing goes back to step S701.

In step S702, the battery is checked. If a predetermined voltage is secured, the processing proceeds to step S703, wherein the ON/OFF states of the vibration correction control stop switch SW3 are determined. Then, when the switch SW3 is turned OFF, no lamp indication is carried out, but the processing goes to step S705. Further, when the switch SW3 is turned ON, the processing proceeds to step S704, wherein the lamp of the indicator 12 is blinked at a frequency of 8 Hz.

In step S705, the vibration detector 1 is started up. In step S706, the distance measuring device 6 and the light measuring device 7 are started up, thereby measuring both the distance and the light.

In step S707, there is checked whether or not the result of the distance measurement output from the distance measuring device 6 is nearer than a focusing range Am. If nearer than the focusing range Am, this indicates an impossible-of-focusing state, and therefore the lamp of the indicator 12 is extinguished in step S708.

In step S709, the half-press (the switch SW1 is turned ON) of the release button is determined. Then, when the switch SW1 is turned ON, the processing returns to step S708. When the switch SW1 is turned OFF, the processing goes back to step S701 in which there is a wait for re-performing the half-press operation.

In step S707, when determining that the result of the distance measurement exceeds the focusing range Am, this indicates a possible-of-focusing state, and hence the processing proceeds to step S710, wherein the time count is started. In step S711, the focusing controller 8 effects the autofocusing corresponding to the result of the distance measurement, and the focusing controller 8 shifts the focusing optical system L2 to an in-focus position through the drive system 9.

In step S712, whether or not the count time reaches a predetermined time is determined, and there is a wait until the count time reaches the predetermined time. When reaching the predetermined time, the half-press (the switch SW1 is turned ON) of the release button is determined in step S713. Further, when the switch SW1 is turned ON, the processing moves to step S714. When the switch SW1 is turned OFF, the processing goes back to step S701, wherein there is a wait for re-performing the half-press operation.

In step S714, whether or not the release button is fully pressed (the switch SW2 is turned ON) is checked. When the switch SW2 is turned OFF, the processing proceeds to step S715 in which whether the switch SW3 is turned ON or not is determined. When the switch SW3 is turned ON, the lamp of the indicator 12 continues to be blinked at the frequency of 8 Hz (step S716), and the processing returns to step S713. Also, when the switch SW3 is turned OFF, the lamp of the indicator 12 is extinguished (step S717). Checked subsequently is whether or not the vibration quantity detected by the vibration detector 1 is smaller than a predetermined quantity B (step S718).

At this time, the lamp of the indicator 12 is on the blink at 8 Hz in step S704. If the vibration quantity is smaller than the predetermined quantity B, the processing proceeds to step S719, wherein the lamp of the indicator 12 is switched over to a light-up state (second state). Then, the processing goes back to step S713.

Further, in step S718, if the vibration quantity is larger than the predetermined quantity B, the lamp of the indicator 12 is blinked at 2 Hz and thus indicated in step S720, and the processing returns to step S713.

On returning to step 5713 from step 5719, when still on the half-press operation without fully pressing the release button, the processing proceeds to step S715 via step S714 from step S713. When the detected vibration quantity is larger than the predetermined quantity B, the processing goes to step S720, wherein the lamp of the indicator 12 is switched over to the blinked state at 2 Hz from the extinguished state. Then, the processing returns to step S713.

If the vibration quantity is smaller than the predetermined quantity B, and when the lamp of the indicator 12 is being lit up, the photographer confirms the light-up of the lamp of the indicator 12 and then fully presses the release button. At this time, with the full-press operation (switch SW2 is turned ON), the processing proceeds to step S721 from step S714, wherein the lamp of the indicator 12 is extinguished. In step S722, whether or not the switch SW3 is turned ON is determined.

When the switch SW3 is turned ON, the processing moves to step S804 in FIG. 11, wherein the vibration correction lens unit L3 is centered. The processing then proceeds to step S803 in which the exposure is started, i.e., the photographing takes place.

Further, when the switch SW3 is turned OFF, the processing moves to step S801 in FIG. 11, wherein the vibration correcting lens unit L3 is centered. After the vibration correction drive has been carried out in step S802, the exposure is started in step S803, viz., the photographing takes place.

In this step S803, the exposure controller 10 is commanded to control the stop in accordance with the output (result of the light measurement) of the light measuring device 7. In response to this command, the exposure controller 10 drive-controls the lens shutter acting as the stop member 11, thereby controlling an exposure corresponding to the stop value. A photo is thus taken.

Then, in step S805, it is determined whether or not the breakoff time set based on the result of the above light measurement is reached. When reaching the breakoff time conceived as a timing of closing the shutter, the processing proceeds to step S807, wherein the exposure controller 10 is commanded to finish the exposure control. In step S808, the vibration correcting device 4 is commanded to stop the vibration correction.

In response to this command, the vibration correcting device 4 stops the drive of the drive system 5, thus stopping the vibration correcting operation. Further, in step S809, the film is wound up by one frame by driving an unillustrated film winding mechanism, and the program comes to an end.

Also, in step S805, when determining that the breakoff time is not reached, the processing goes to step S806, wherein whether the exposure is OK or not is determined. If OK, the processing proceeds to step S807. Whereas if NO, the processing goes back to step S805.

Herein, Tables 2 and 3 show specific examples of the breakoff time conceived as the timing of closing the shutter in step S805.

That is, it is preferable that the breakoff time is set as shown in the following Table 2 when a focal length of the photographing lens system is on the telephoto side.

TABLE 2

[Telephoto/Wide Angle] Focal Length 105 mm →
Camera Shake Limit Speed 1/105 sec.

| VR | SB Mode | | |
|---|---|---|---|
|  | Auto | Slow Synchro | Off |
| ON | 1/15 sec. | 1/4 sec. | 1/4 sec. |
| OFF | 1/60 sec. | 1/15 sec. | 1/4 sec. |

Herein, the focal length of the photographing lens system is 105 mm on the telephoto side, and, therefore, the camera shake limit shutter speed is 1/105 sec. in the case of providing no vibration correcting device VR. In the VR off mode (vibration correction off mode), the breakoff time is set at 1/60 sec., substantially approximate to this shutter speed.

Further, when the vibration correction is OK, the values on the side slower by one or more levels than this are selectable. In accordance with this embodiment, there is selected 1/15 sec., i.e., a value on the slower side by two levels. Incidentally, the breakoff time differs depending on the zooming, and, when the object moves, a flow condition on the photo changes. Hence, the photos are consecutively taken while effecting the zoom, and when the user sees the photos arranged after they are developed the result is that the photos are unnatural. Therefore, the breakoff time is based on the value set on the telephoto side, and the same value is also selected on the wide-angle side.

Further, when based on a case where the focal length of the photographing lens system is on the wide-angle side, it is preferable that the breakoff time is set as shown in the following Table 3.

TABLE 3

[Telephoto/Wide Angle] Focal Length 35 mm →
Camera Shake Limit Speed 1/35 sec.

| VR | SB Mode | | |
|---|---|---|---|
|  | Auto | Slow Synchro | Off |
| ON | 1/8 sec. | 1/2 sec. | 1/2 sec. |

TABLE 3-continued

[Telephoto/Wide Angle] Focal Length 35 mm →
Camera Shake Limit Speed 1/35 sec.

| VR | SB Mode | | |
|---|---|---|---|
|  | Auto | Slow Synchro | Off |
| OFF | 1/30 sec. | 1/8 sec. | 1/2 sec. |

Namely, if the capability of the vibration correcting device VR is higher than in the example of Table 2 where the basis is the telephoto side, the slow shutter can be better attained by setting the breakoff time on the side-angle side than on the telephoto side. Besides, this is effective in photographing a night scene.

That is, according to the present invention having the above-mentioned construction, the camera is equipped with the zoom photographic optical systems L1, L2, the vibration correcting device serving as a vibration correcting mechanism, the drive system 5 thereof, the light measuring device 6 and the flashlight emitting device. In this camera, the CPU 2 serves as the controller for performing the exposure photographing at a speed slower by at least one level than the shutter speed determined by an inverse number of the focal length. The CPU 2 controls the breakoff time in the photographing to a fixed value irrespective of the zooming by the photographing lens systems L1, L2, wherein the focal length serving as a basis for the shutter speed is set to the maximum or minimum focal length.

Then, according to the construction described above, in the camera including the vibration correcting device, because of the property that the vibrations are not produced also at the time of the slow shutter, the slow restriction of the shutter speed is set making it possible to photograph at the speed slower by at least one level than the shutter speed determined by the inverse number of the focal length for the purpose of clearly shooting the background in the normal photographing or flash light photographing, and it is also possible to take photos in a dark place and with a well-depicted background.

Herein, the camera according to the present invention discussed above is constructed to make, when taking the photo, the photographing is possible at the speed slower by at least one level than the shutter speed determined by the inverse number of the focal length.

Further, the breakoff time in the flash photographing is set making it possible to photograph at the speed slower by at least one level than the shutter speed determined by the inverse number of the focal length. Moreover, when selectively switched over to the slow synchro mode, the photographing is possible at the speed slower by one level than the above-mentioned breakoff time.

Then, according to the above construction, when a subject is photographed by using no flashlight emitting device, the slower shutter than by the prior art can be attained, and, hence, the photographing can take place in a darker place.

Furthermore, when a subject is photographed by using the flashlight emitting device, it is possible to perform the photographing making full use of the background light. In addition, photographing is possible, wherein the background is more visible than in the slow synchro mode.

Accordingly, the above construction exhibits such advantages that the vibration correcting device is capable of not only preventing the vibrations, but also extending the photographing range to a much darker place as well as making it possible to take a more natural photo making use of the background light. Additionally, the breakoff time in the photographing is the same both on the telephoto side and on the wide-angle side, and, hence, there is such an advantage that the natural photos can be obtained even by seeing the arranged photos taken while effecting the zooming.

Note that the present invention is not confined to the embodiments discussed above, but the configurations and structures of the vibration correcting device and the respective elements of the camera including the same device are, as a matter of course, changeable and modifiable.

As discussed above, the camera having the vibration correcting device according to the present invention comprises the zoom photographic optical systems, the vibration correcting device, the light measuring device and the flashlight emitting device. Further, the controller performs the exposure photographing at the speed slower by at least one level than the shutter speed determined by the inverse number of the focal length. This controller is controls the breakoff time in the photographing to the fixed value regardless of the zooming by the photographing optical system, wherein the focal length serving as the basis of the shutter speed is set to the maximum or minimum focal length. Consequently, the following excellent advantages are exhibited.

That is, according to the present invention, in the camera having the vibration correcting device, because of the property that the vibrations are not produced also at the time of the slow shutter, the slow restriction of the shutter speed is set making it possible to photograph at the speed slower by at least one level than the shutter speed determined by the inverse number of the focal length for the purpose of clearly shooting the background in the normal photographing or flash photographing, and it is also possible to take photos in the dark place and with the well-depicted background.

In other words, according to the present invention, when a subject is photographed by using no flashlight emitting device, the slower shutter than by the prior art can be attained, and, hence, the photographing can take place in the darker place.

Furthermore, according to the present invention, when a subject is photographed by using the flashlight emitting device, it is possible to perform the photographing by making full use of the background light.

In addition, the photographing is possible, wherein the present invention makes it possible to take a picture in which the background is more conspicuous even in the slow synchro mode.

Accordingly, the present invention exhibits such advantages that the vibration correcting device is capable of not only preventing the vibrations, but also extending the photographing range to the much darker place as well as making it possible to take the more natural photo making use of the background light.

Additionally, the breakoff time is the same both on the telephoto side and on the wide-angle side, and, hence, there is exhibited such an excellent advantage that the natural photos can be obtained even by seeing the arranged photos taken while zooming the zoom lens.

Figure 12:
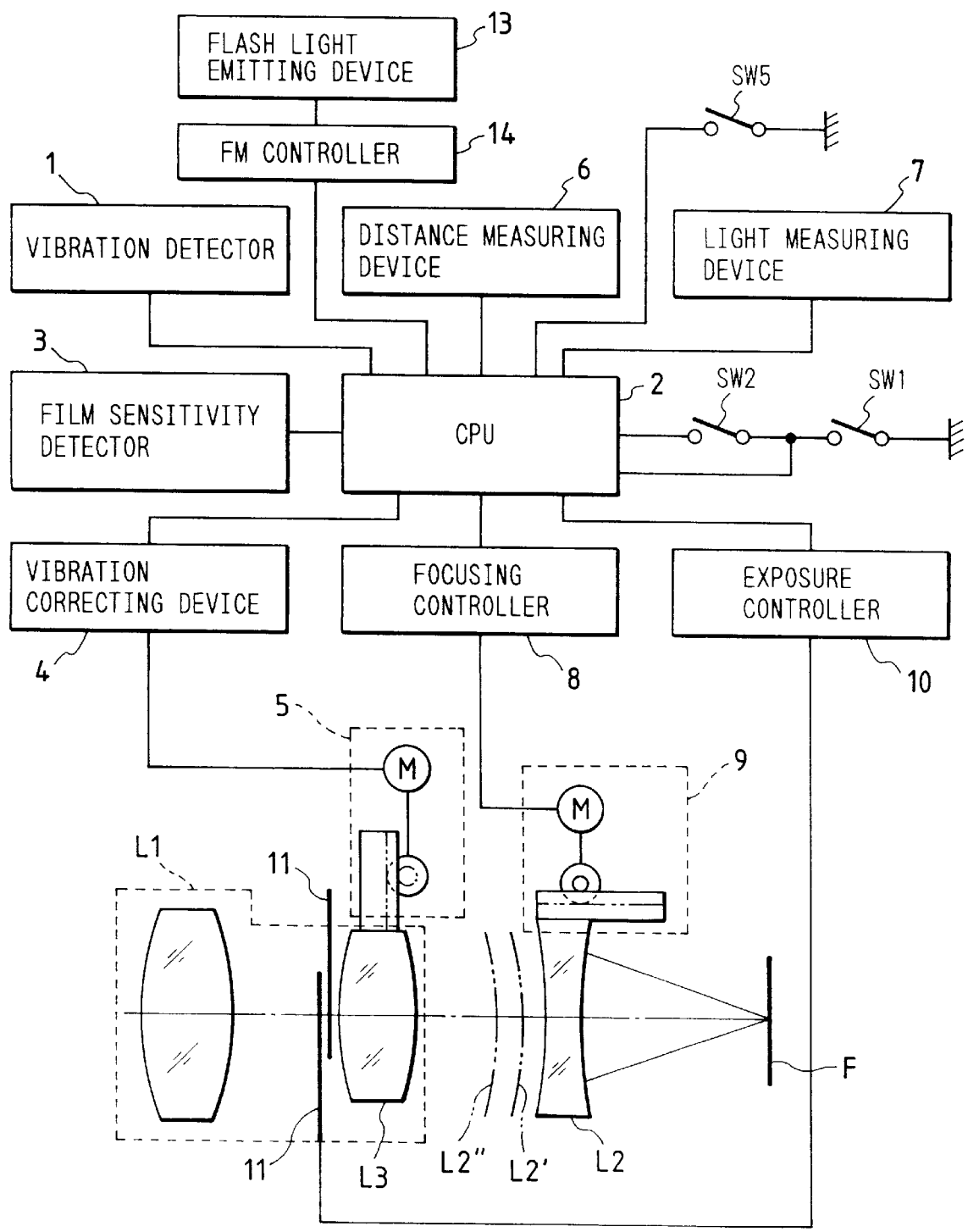
FIG. 12 is a block diagram of a control mechanism illustrating the third embodiment of the camera having the vibration correcting device according to the present invention.

FIG. 12 illustrates a third embodiment of the camera having the vibration correcting device according to the present invention.

Referring to FIG. 12, the same elements as those shown in FIG. 1 are marked with like numerals, and their explanations will be omitted.

A flashlight emitting device 13 emits a beam of auxiliary photographing light with a low brightness. The flashlight emitting device 13 emits the flashlight with an optimal stop value corresponding to items of distance measurement data and film sensitivity data through an FM controller 14 in response to a signal of the switch SW2 in the flashlight emitting mode (hereinafter termed the SB mode).

A switch SW5, when turned ON, and if the object exists far enough to be impossible of to measure a distance with a distant-view photographing setting switch, sets the photographing lens to a predetermined far distance, and a photo is taken without emitting the flashlight.

Herein, FIGS. 13A through 19 are flowcharts showing an operation sequence of the CPU 2 of FIG. 12. Referring to these flowcharts, the control operation of the CPU 2 based on the structure of FIG. 12 will hereinafter be simply explained.

To start with, in a state where the main power switch of the camera body is turned ON, when half-pressing the shutter release button, the processing proceeds from step S901 to step S902 in FIG. 13A. Upon turning ON the switch SW1, the processing goes to step S903, wherein the CPU 2 checks whether the battery has sufficient power.

Further, when determining that the battery has sufficient power, the processing proceeds to step S904 in which the vibration detector is started up. Further in step S905, sampling of a vibration signal is started.

Then, the processing proceeds to step S906, wherein the light-and-distance measurements of the object are carried out. Next, in step S907, an exposure is calculated. After obtaining an item of data indicating whether or not the photographing is performed in the SB mode, it is determined whether or not the switch SW5 is turned ON in step S920. If the switch SW5 is turned ON, the distant-view photographing mode is executed in step S921. Whereas if the switch SW5 is turned OFF, the FM arithmetic operation is conducted in step S908, thus determining the stop value when in the SB flashing.

Then, a focusing lens position is calculated from the result of the distance measurement in step S909. In step S910, whether the camera is in the SB flashlight photographic state or not is determined in the SB mode determining step shown in FIG. 18. If the SB flashlight is needed, and when the result of the distance measurement in step S906 is larger than a predetermined value A in step S911, the photographic operation set in the low-speed AE mode in step S912 is carried out. Whereas if the photographing distance is smaller than the predetermined value A, whether the camera is set in the SB flashlight inhibition mode or not is determined through the selection by the outside operation switch in step S913. If the camera is in the SB flashlight inhibition mode, the operation is set in the low-speed AE mode of step S912.

Further, whereas if not in the SB flashlight inhibition mode, the processing proceeds from step S913 to step S914, wherein whether the camera is in the slow synchro mode or not is determined. If set in the slow synchro mode, the photographing is conducted in the slow synchro mode of S916. Whereas if not in the slow synchro mode, the processing shifts to step S915, wherein the photographing is conducted in the SB mode.

When determining that the SB flashlight is unnecessary in step S910, the processing proceeds to step S918, wherein it is determined whether the camera is in the forcible SB mode or not through the selection by the outside operation switch. If in the forcible flashing, the mode turns out the SB mode in step S915. Whereas if not, the operation is set in the high-speed AE mode in step S919, thereby performing the photographing.

Then, after finishing each mode, the film is wound up by one frame in step S917, thus finishing the operation based on this flowchart.

Figure 13B:
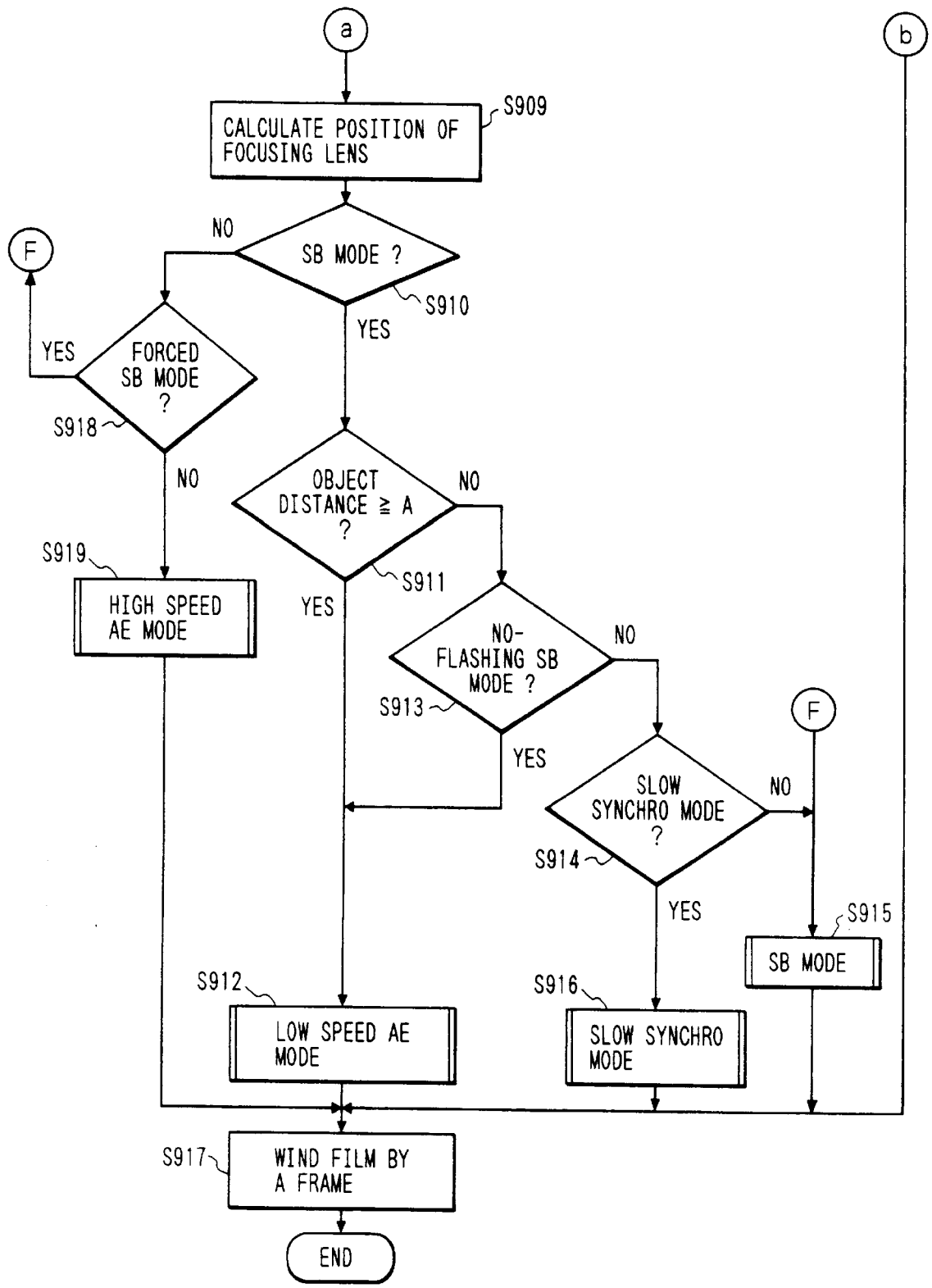
Figure 14:
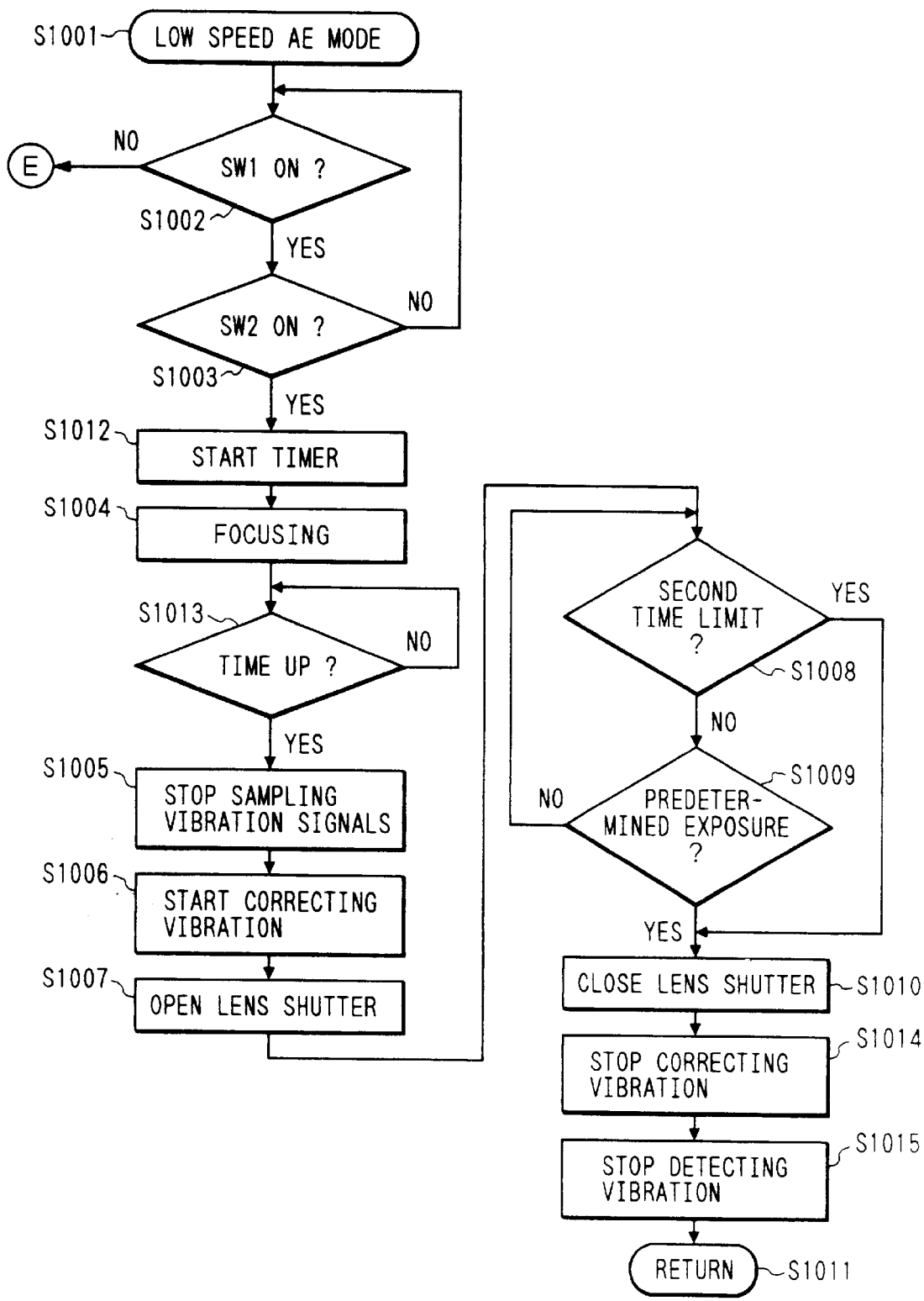
FIG. 14 is a flowchart showing the low-speed AE mode of FIGS. 13A and 13B.

FIG. 14 shows the operation in the low-speed AE mode (S912 in FIG. 13B). The operation enters the low-speed AE mode in step S1001, and whether or not the half-press switch SW1 of the release button is turned ON is determined in step S1002.

Herein, if the switch SW1 is not turned ON, the processing goes back to step S902 in FIG. 13A.

Further, when the half-press switch SW1 is turned ON, the processing proceeds to step S1003, wherein it is determined whether the release button is fully pressed or not. If fully pressed, the processing goes to step S1012, wherein the timer is started.

Next, the processing proceeds to step S1004 in which the drive system 9 (see FIG. 12) shifts the focusing optical system L2 conceived as a focusing lens on the basis of the value calculated in step S909.

Herein, if the result of the distance measurement is large, the focusing optical system L2 is shifted to a position L2" in FIG. 12. Whereas if the result of the distance measurement is small, the focusing optical system L2 is shifted to a position L2'. The shift quantity becomes larger with a longer distance, and the focusing time also increases.

Herein, the shifting device drives, as indicated by the numeral 9 in FIG. 12, e.g., the stepping motor M to shift the focusing optical system L2 in the optical-axis direction through the rack pinion.

In step S1013, after the focusing operation has been finished, whether a predetermined time elapses or not is determined. When determining that the predetermined time has elapsed in step S1013, the sampling of the vibration signal is finished in step S1005. In step S1006, the determination fiducial value for the calculation of the vibration quantity is arithmetically obtained, and a present vibration quantity is calculated. The vibration correcting device is driven based on the thus calculated vibration quantity, thereby starting the vibration correcting operation of the vibration correction lens L3.

Performing this vibration correcting operation involves rotating, e.g., the motor M in accordance with the vibration quantity and shifting the vibration correction lens L3 in the direction orthogonal to the optical axis through the rack pinion.

Next, the lens shutter 11 starts opening in step S1007. In step S1008, a limiter, i.e., a second breakoff time (or second time limit) is determined so as not be longer than a second shutter drive time defined as a shutter drive time for a vibration correction limit in the case of a predetermined high-level photographer. Hence, if over this second breakoff time, the processing proceeds to step S1010 to close the lens shutter 11. Then, the vibration correction is finished in step S1014, and thereafter the detection of the vibration is ended in step S1015.

Whereas if the predetermined drive time (second breakoff time) is not reached, whether or not the value comes to a proper exposure value calculated in step S1007 is determined in step S1009. If it becomes the proper value, the processing proceeds to step S1010, wherein the lens shutter 11 is closed. Then, in step S1011, the processing returns to the main routine in FIGS. 13A and 13B.

Figure 15:
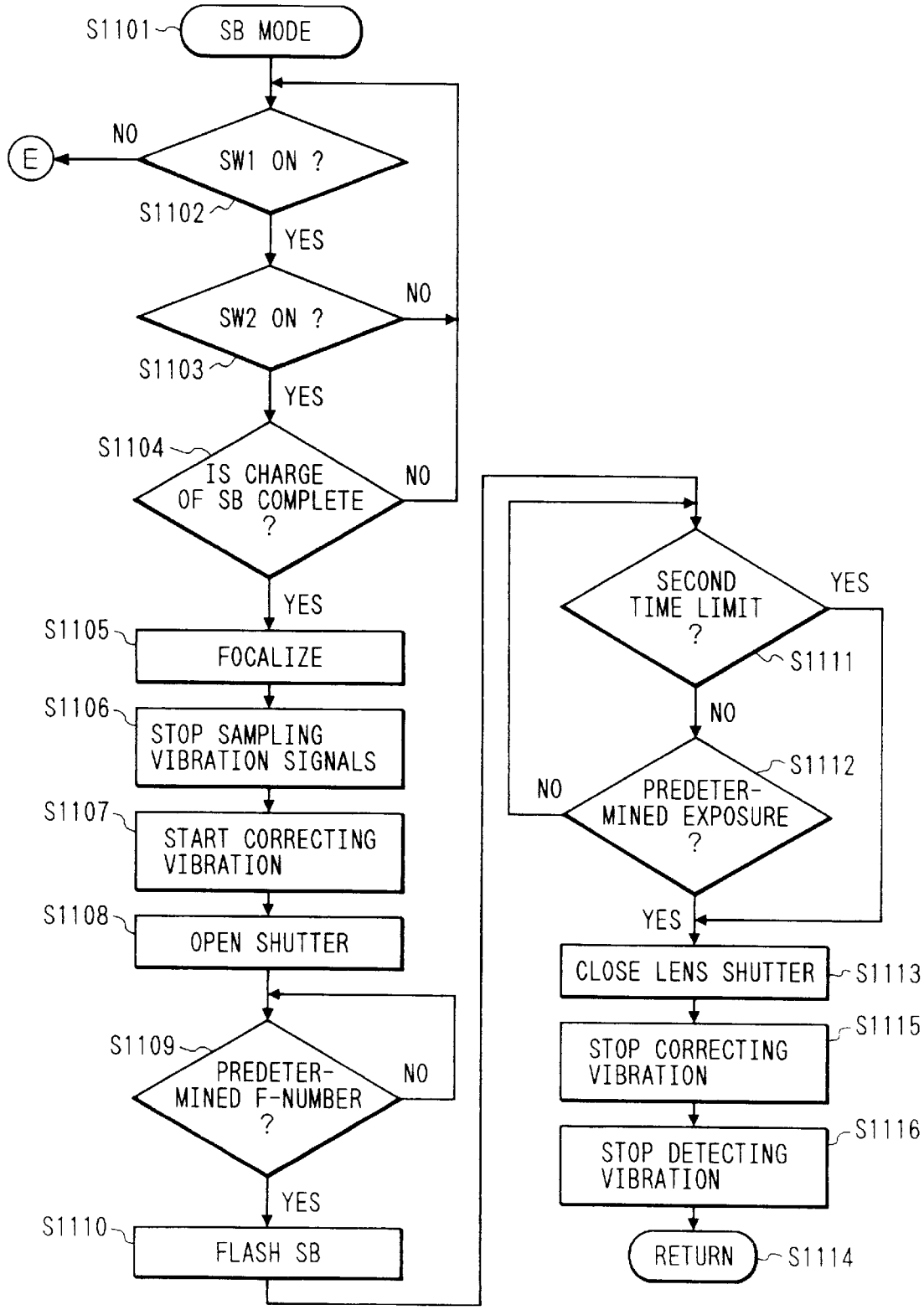
FIG. 15 is a flowchart showing the SB mode of FIGS. 13A and 13B.

FIG. 15 shows the operation in the SB mode (S915 in FIG. 13B). In step S1101, the operation enters the SB mode.

This mode is relative to a case where the drive time is shorter than a drive time in the AE mode.

The SB mode in steps S1101–S1103, the ON-check of the switch SW1 and the ON-check of the switch SW2 are the same as those in the above-mentioned steps S1001–S1003 in FIG. 14. In step S1104, a charging state of the electronic flash is determined. If the charging not yet completed, the processing goes back to step S1102. Further, the focusing in steps S1105–S1108, finishing the sampling of the vibration signal, starting the vibration correction and opening the lens shutter are substantially the same as those in steps S1004–S1007 in FIG. 14 except that the timer count is not conducted.

Determined in step S1109 is whether or not the lens shutter 11 comes to a predetermined f-number. When reaching the predetermined f-number (arithmetic result in S908), the electronic flash emits the flashlight in step S1110.

Note that the breakoff time check for the vibration correction limit in the case of a beginner in steps S1111–S1116, the predetermined exposure check, closing the lens shutter and returning are the same as those in steps S1014, S1015 in FIG. 14, and, hence, their detailed explanations will be omitted.

Figure 16:
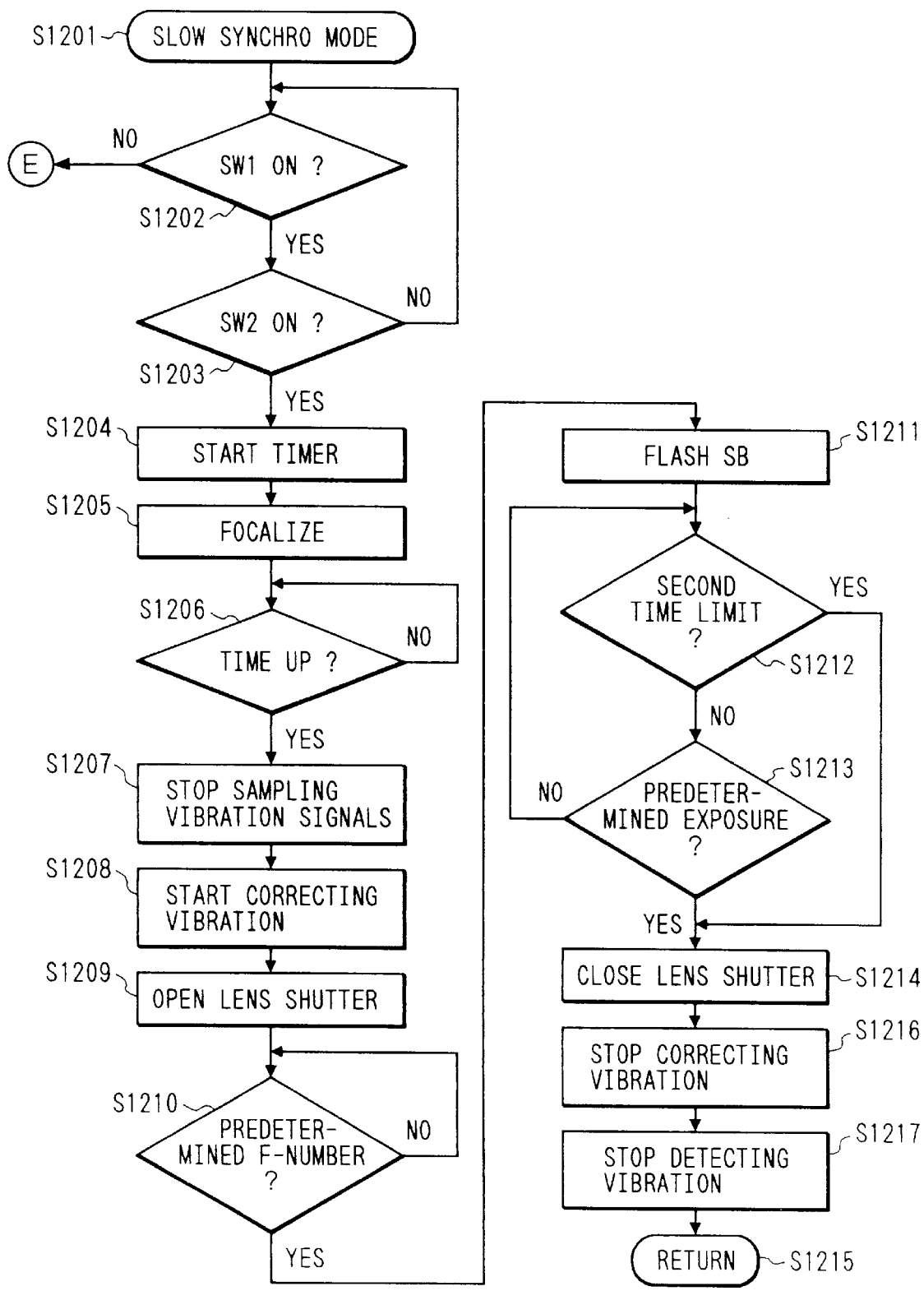
FIG. 16 is a flowchart showing the slow synchro mode of FIGS. 13A and 13B.

FIG. 16 shows the operation in the slow synchro mode (S916 in FIG. 13B). In this mode, a drive time is the same as the drive time in the AE mode.

Herein, the slow synchro mode in steps S1201–S1209, the ON-check of the switch SW1, the ON-check of the switch SW2, starting the timer, the focusing, the time-up, finishing the sampling of the vibration signal, starting the vibration correction and opening the lens shutter are the same as those in above-stated steps S1001–S1007 (including the timer count control in steps S1012, S1013) in FIG. 14, and hence the explanations thereof will be omitted.

Further, the check of the predetermined f-number in steps S1210–S1217, the emission of the flashlight of the electronic flash, the check of the second breakoff time, the predetermined exposure check, closing the lens shutter, finishing the vibration correction, finishing the vibration detection and returning are the same as those in above-described steps S1109–S1116 in FIG. 15, and simply, the drive time is longer than in the SB flashlight mode.

Figure 17:
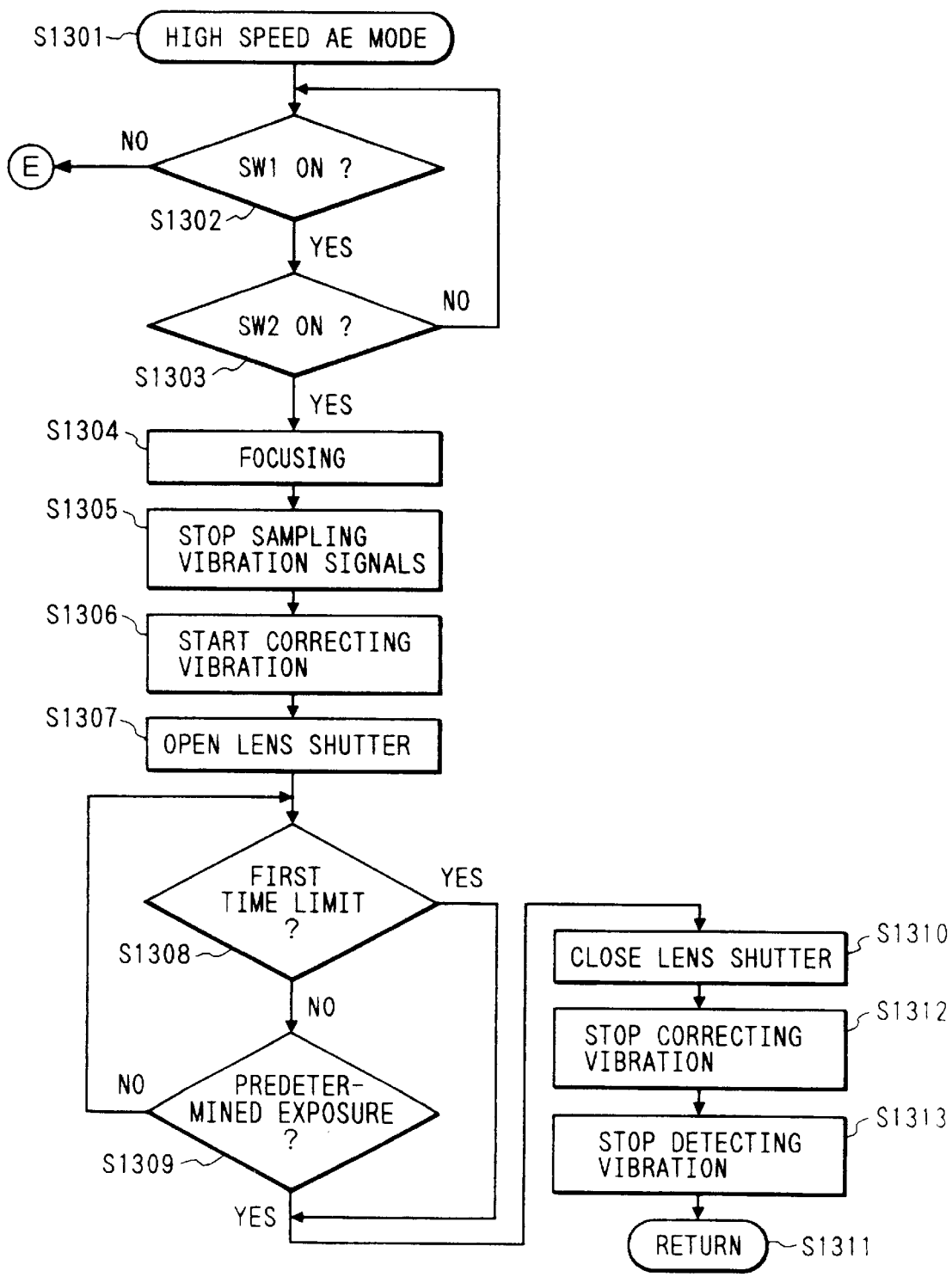
FIG. 17 is a flowchart showing the high-speed AE mode of FIGS. 13A and 13B.

FIG. 17 shows the operation in the high-speed AE mode (S919 in FIG. 13B). An outline of the operation thereof is substantially the same as that in the above-stated low-speed AE mode in FIG. 14 except that there is no timer count control in steps S1012, S1013. Steps S1301 through S1311 are the same as the respective steps S1001 through S1011 in FIG. 14 and therefore, the detailed explanations will be omitted.

Figure 18:
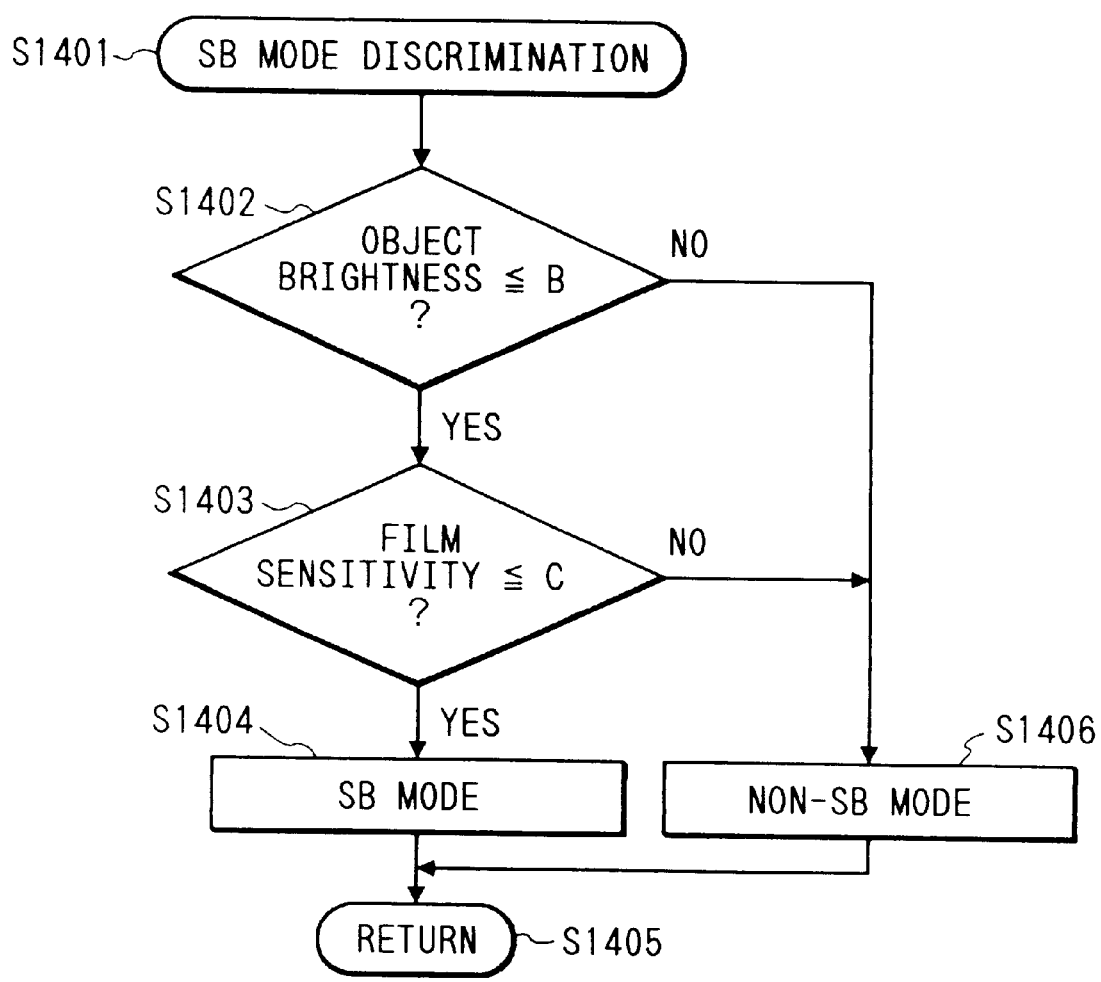
FIG. 18 is a flowchart of assistance in explaining a determining step in the SM mode of FIGS. 13A and 13B.

Herein, referring to FIG. 18, according to the SB mode discrimination (S910 in FIG. 13B) in S1401, as is obvious from FIG. 18, the following will be readily understood. Whether or not the object brightness is smaller than the predetermined value B is determined in step S1402. If larger than the value B, the processing jumps to step S1406 wherein the operation is set in the non-SB mode. The processing is returned in step S1405. On the other hand, when determining that the object brightness is substantially equal to or smaller than the predetermined value B, the film sensitivity (ISO) is compared with the predetermined value C in step S1403. The SB mode is, it can be easily understood, selected in step S1404 when equal to or smaller than the value C.

Figure 19:
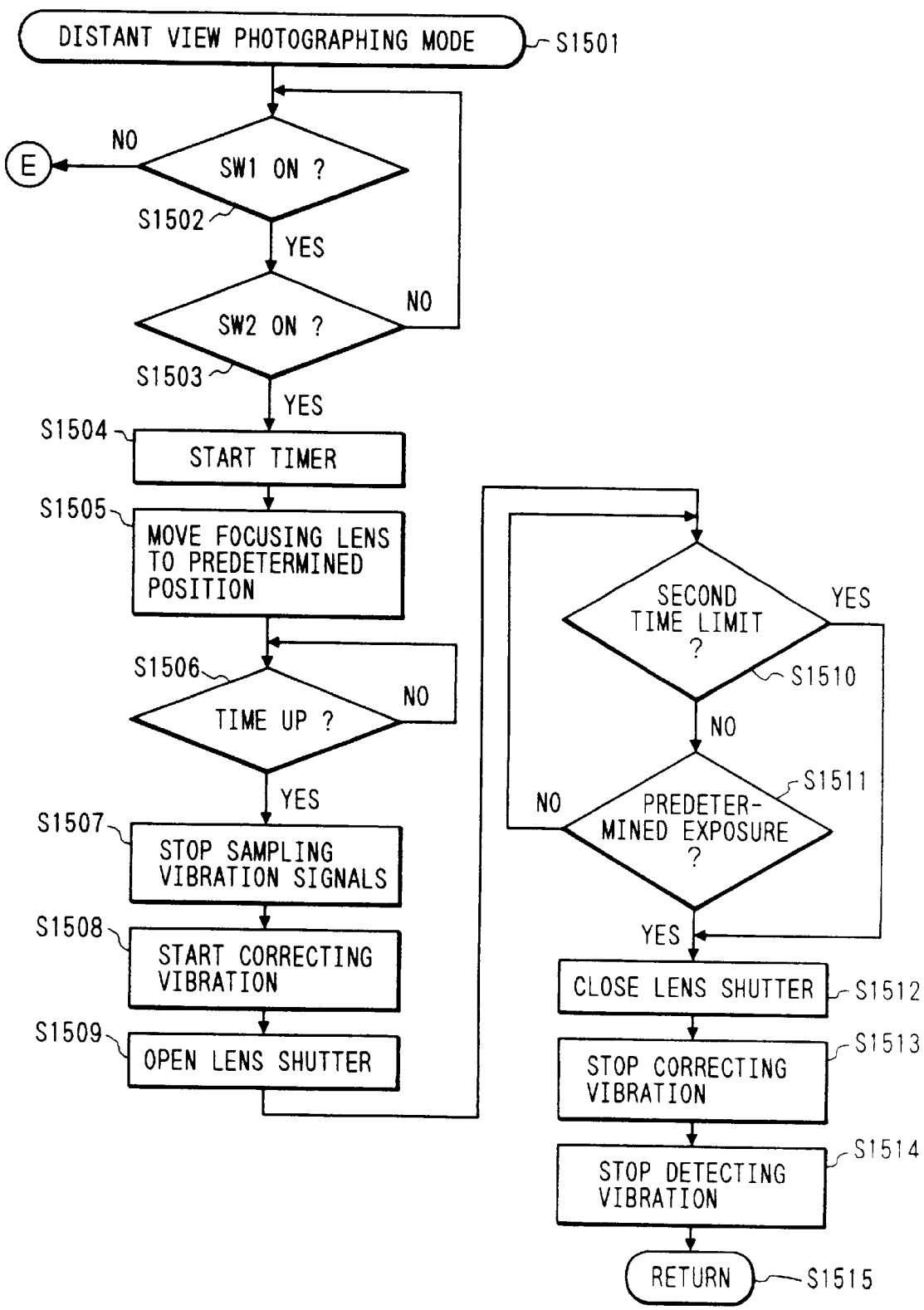
FIG. 19 is a flowchart of assistance in explaining a determining step in the distant-view photographing mode of FIGS. 13A and 13B.

FIG. 19 shows the operation in the distant-view photographing mode. In step S1502, it is determined whether or not the half-press switch SW1 of the shutter release button is turned ON. Herein, if the switch SW1 is not turned ON, the processing returns to step S902 in FIGS. 13A and 13B. Whereas if the switch SW1 is turned ON, the processing proceeds to step S1503, wherein whether or not the shutter release button is fully pressed is determined. If fully pressed, the processing goes to step S1504, wherein the timer is started. Subsequently, the processing proceeds to step S1505 in which the photographing lens L2 is shifted by the above-mentioned drive system 9 to an in-focus position corresponding to a predetermined distance of the distant view. When determining that a predetermined time has elapsed after finishing the focusing operation in step S1506, the sampling of the vibration signal is ended in step S1507. In step S1508, the determination fiducial value for calculating the vibration quantity is arithmetically obtained, and a present vibration quantity is calculated. Then, the vibration correcting device is driven based on the thus calculated vibration quantity, thereby starting the vibration correcting operation of the vibration correction lens L3. Subsequently in step S1509, the lens shutter starts opening. In step S1510, the limiter, viz., the second breakoff time is determined so as not to be longer than a predetermined second shutter drive time longer than the first shutter drive time. Hence, when reaching the second breakoff time, the processing proceeds to step S1512, wherein the lens shutter 11 is closed. On the other hand, when the predetermined second breakoff time is not reached, whether or not the value becomes the proper exposure value calculated in step S907 is determined in step S1511. When becoming the proper value, the processing goes to step S1512. In step S1513, the operation of the vibration correcting device is stopped, and the vibration detecting operation is also stopped in step S1514. Then, the processing returns to the main routine in step S1515.

Note that the present invention is not confined to the above-discussed embodiment, but the configurations of the respective elements can be, as a matter of course, properly varied and modified.

For example, the vibration detection fiducial value is calculated by the CPU 2 in interlock with the half-press switch SW1 of the shutter release button. The calculation thereof is not limited to this but may be done by providing a dedicated switch operation member. The vibration correcting device is also not confined to the present embodiment but may employ a motor feed screw method and a voice coil method.

As discussed above, according to the present invention, in normal photographing requiring no special setting operation, the breakoff time of the shutter drive time is set in the vibration correction limit for the ordinary beginner, and, therefore, the depiction of the background can be expressed more naturally than before even in the flash auxiliary light photography. It is also possible for the advanced photographer who causes less camera shake to perform the hand-hold photographing with no blur for a long drive time by selecting the photographing mode involving the special setting operation. and further an extension of the breakoff time. Particularly in the distant-view photographing with a low brightness, the vibration correcting control is conducted without emitting the flashlight, and hence this is effective in the natural depiction of the photography even in snow or in a fog.

It is apparent that, in this invention, a wide range of different working modes can be formed based on the invention without deviating from the spirit and scope of the invention. This invention is not restricted by its specific working modes except as limited by the appended claims.

What is claimed is:

1. A camera comprising:

a flashlight device to emit a flashlight;

a shutter, wherein the camera has a flash synchro photographing mode in which said flashlight device emits the flashlight in synchronism with said shutter and a non-emission mode in which the camera takes a photograph without the flashlight device emitting the flashlight;

a vibration detecting device for detecting a vibration quantity of said camera and, in response, outputting a vibration signal;

a vibration correcting device for correcting an image blur based on the vibration signal output from said vibration detecting device; and a control device for controlling said shutter, while simultaneously driving said vibration correcting device, such that a first maximum shutter time in the flash synchro photographing mode is no greater than a second maximum shutter time in the non-emission mode of the camera, thereby causing said flashlight device not to emit the flashlight.

2. A camera comprising:

a flashlight device;

a shutter;

a vibration detecting device for detecting a vibration quantity of said camera and, in response, outputting a vibration signal;

a vibration correcting device for correcting an image blur; and a control device for controlling said vibration correcting device based upon the vibration signal output from said vibration detecting device; and a shutter driving device for driving said shutter, wherein said control device controls said shutter driving device to close said shutter when a predetermined breakoff time has elapsed from the time of performing photographing by driving said vibration correcting device, and wherein a first breakoff time which is set in accordance with a flash photographing mode of the camera which uses said flashlight device is no greater than a second breakoff time which is set in accordance with a non-flash photographing mode of the camera which does not use said flashlight device.

3. A camera comprising:

a zoom optical system for varying a focal length by a zooming drive;

a vibration detecting device for detecting a vibration state of the camera;

a vibration correcting device for correcting an image blur based upon the vibration state detected by said vibration detecting device;

a light measuring device for measuring a brightness of an object;

a flashlight emitting device for performing selective flashlight photographing; and a control device for effecting exposure photographing at a speed slower by at least one level of potential shutter speed settings of the camera than a shutter speed determined by an inverse number of the focal length in accordance with whether said vibration correcting device corrects the image blur, wherein said control device sets the focal length used in determining the shutter speed to a maximum focal length and makes a breakoff time fixed when effecting the photographing irrespective of the zooming drive of said zoom optical system.

4. A camera comprising:

a zoom optical system for varying a focal length by a zooming drive;

a vibration detecting device for detecting a vibration state of the camera;

a vibration correcting device for correcting an image blur based upon the vibration state detected by said vibration detecting device;

a light measuring device for measuring a brightness of an object;

a flashlight emitting device for performing selective flashlight photographing; and a control device for effecting exposure photographing at a speed slower by at least one level of potential shutter speed settings of the camera than a shutter speed determined by an inverse number of the focal length in accordance with whether said vibration correcting device corrects the image blur, wherein said control device sets the focal length used in determining the shutter speed to a minimum focal length and makes a breakoff time fixed when effecting the photographing irrespective of the zooming drive of said zoom optical system.

5. A camera comprising:

a shutter;

a vibration detecting device for detecting a vibration quantity of said camera and, in response, outputting a vibration signal;

a vibration correcting device for correcting an image blur based upon the vibration signal output from said vibration detecting device;

a shutter control device for controlling a shutter drive time of said shutter;

a selecting device for selecting a first drive time as the shutter drive time; and a distance measuring device for measuring a distance to an object, wherein the first drive time is set to no greater than $1/15$ sec., and said selecting device selects one of the first drive time and a second drive time longer than the first drive time as the shutter drive time based upon the distance measured by said distance measuring device.

6. A camera according to claim 5, further comprising a flashlight emitting device.

7. A camera according to claim 6, further comprising:

a light measuring device for measuring a brightness of the object and, in response, outputting a photometric result; and a flashlight emission determining device for determining whether to cause said flashlight emitting device to emit the flashlight based upon a photometric result output by said light measuring device.

8. A camera according to claim 7, wherein said flashlight emission determining device determines not to cause said flashlight emitting device to emit the flashlight and said selecting device selects the second drive time, in response to determining that the object is farther than a predetermined distance.

9. A camera according to claim 8, further comprising a photographing optical system for providing a light path of an image of the object to reach a recording medium, wherein the predetermined distance is determined by a guide number of said flashlight emitting device and an f-number of said photographing optical system.

10. A camera according to claim 9, further comprising a film sensitivity detecting device for detecting sensitivity data of the recording medium loaded into said camera, wherein the predetermined distance is further determined based on the sensitivity data.

11. A camera according to claim 5, further comprising a distance setting device for setting said photographing optical system at a predetermined photographing distance, wherein said selecting device selects, in response to said distance setting device operating, the second drive time.

12. A camera according to claim 5, further comprising a distance measuring device for measuring a distance to an object and having a distance measurement range in which to measure the distance to the object, wherein said selecting device selects, in response to the predetermined photographing distance not falling within a far distance end of the distance measurement range, the second drive time.

* * * * *

UNITED STATES PATENT AND TRADEMARK OFFICE
CERTIFICATE OF CORRECTION

PATENT NO. : 5,995,761
DATED : November 30, 1999
INVENTOR(S) : Hiroshi Wakabayashi, et al.

It is certified that error appears in the above-identified patent and that said Letters Patent is hereby corrected as shown below:

Title Page, [30] Foreign Application Priority Data, change
"Apr. 28, 1994 Japan 6-0921631" to
--Apr. 28, 1994 Japan 6-092631--.

Signed and Sealed this

Nineteenth Day of September, 2000

Attest:

Q. TODD DICKINSON

*Attesting Officer*      *Director of Patents and Trademarks*